United States Patent

[11] 3,578,034

[72] Inventor Robert J. Eminger
 Fort Wayne, Ind.
[21] Appl. No. 811,016
[22] Filed Mar. 27, 1969
[45] Patented May 11, 1971
[73] Assignee Fort Wayne Tool & Die, Inc.
 Fort Wayne, Ind.

[54] APPARATUS FOR AUTOMATICALLY WINDING CONCENTRIC DYNAMOELECTRIC MACHINE COILS
 20 Claims, 11 Drawing Figs.

[52] U.S. Cl. ................................................. 140/1,
 140/92.1
[51] Int. Cl. ............................................... B21f 3/00
[50] Field of Search ............................................ 140/1, 92.1,
 92.2; 29/596, 605

[56] References Cited
 UNITED STATES PATENTS

| | | | |
|---|---|---|---|
| 2,736,346 | 2/1956 | Ammann | 140/92.1 |
| 2,782,809 | 2/1957 | Smallridge | 140/92.1 |
| 2,934,099 | 4/1960 | Mason | 140/92.1 |
| 3,036,603 | 5/1962 | Moore | 140/92.1 |
| 3,151,638 | 10/1964 | Hill | 140/92.1 |

Primary Examiner—Lowell A. Larson
Attorney—Hood, Gust, Irish & Lundy

ABSTRACT: Apparatus for automatically winding a set of at least two concentric dynamoelectric machine coils upon a coil form having at least two progressively small steps. A flyer for winding wire on the coil form steps is rotatably supported by a block, and a two-speed electric motor is connected to rotate the flyer. A slide supports the block and flyer for longitudinal movement parallel with the axis of the flyer between forward and rear positions, and latches selectively retain the block and flyer at the forward and at least one intermediate position thereby to locate the flyer in winding relationship with each of the coil form steps. The slide with the block and flyer supported thereon is mounted for longitudinal movement thereby to traverse the flyer across the coil form steps. In one embodiment the slide is oscillated by the motor thereby to level-wind the wire on each of the coil form steps; and in another embodiment the slide is continuously moved from a forward to a rear position by a lead screw driven by the motor. A control circuit is provided which automatically actuates the motor to its low speed a predetermined number of turns in advance of completion of a given coil; and which upon completion of the coil actuates a latch to permit the block and flyer to move rearwardly by one incremental step when the flyer is in a predetermined rotational position with respect to the coil form, thereby to move the flyer into winding relationship with the next coil form step, and actuates the motor to its high speed to initiate winding of the next coil. The motor is preferably a multiphase, two-speed, constant torque induction motor, thus providing very rapid acceleration and deceleration between its high and low speeds, and the latches are preferably electromagnetically actuated from a source of substantially ripple-free direct current, thus providing nearly instantaneous stepping of the flyer, to the end that a set of concentric coils may be automatically wound at high speed without stopping the flyer and with the connections between adjacent coils accurately located.

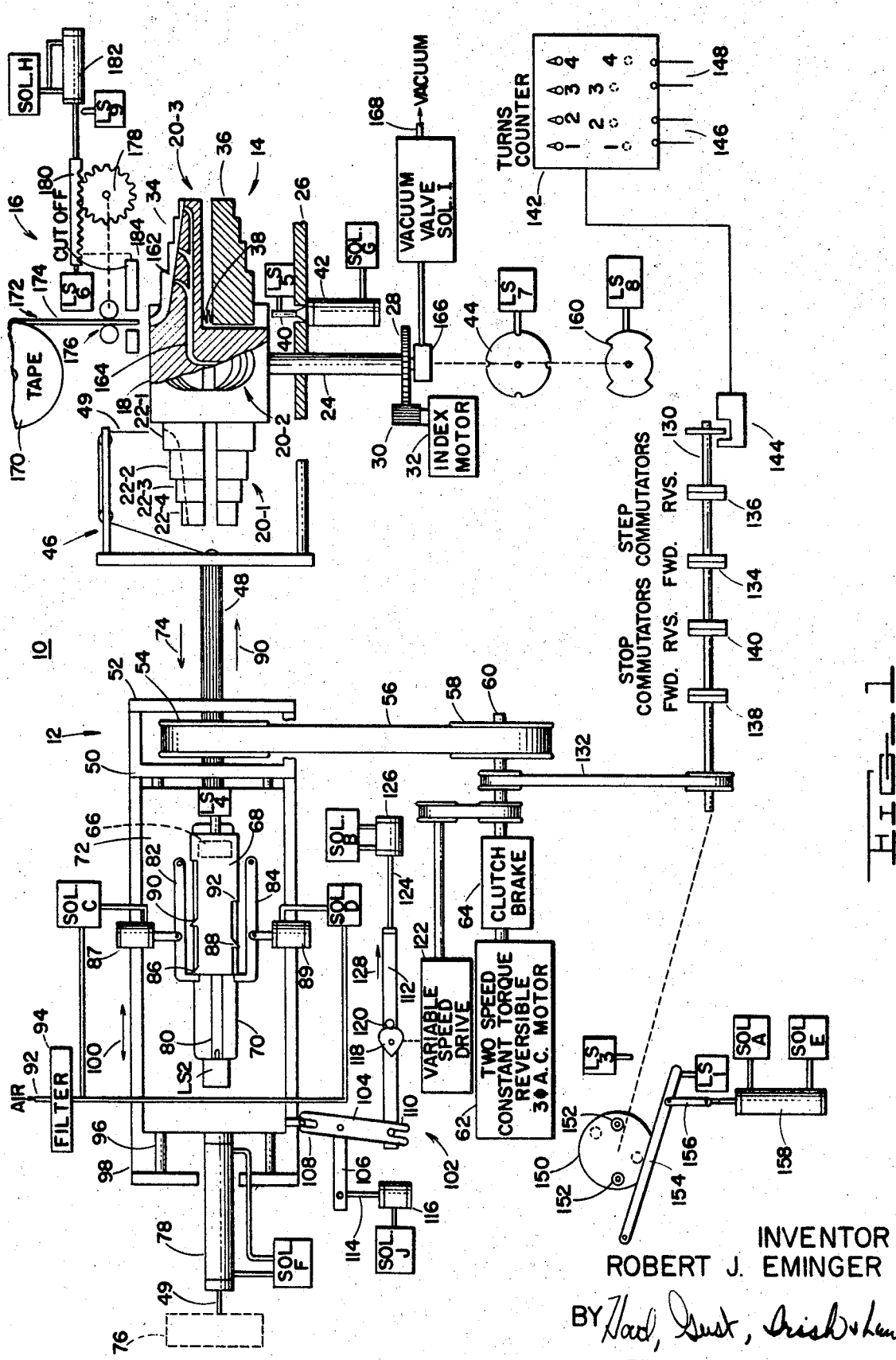

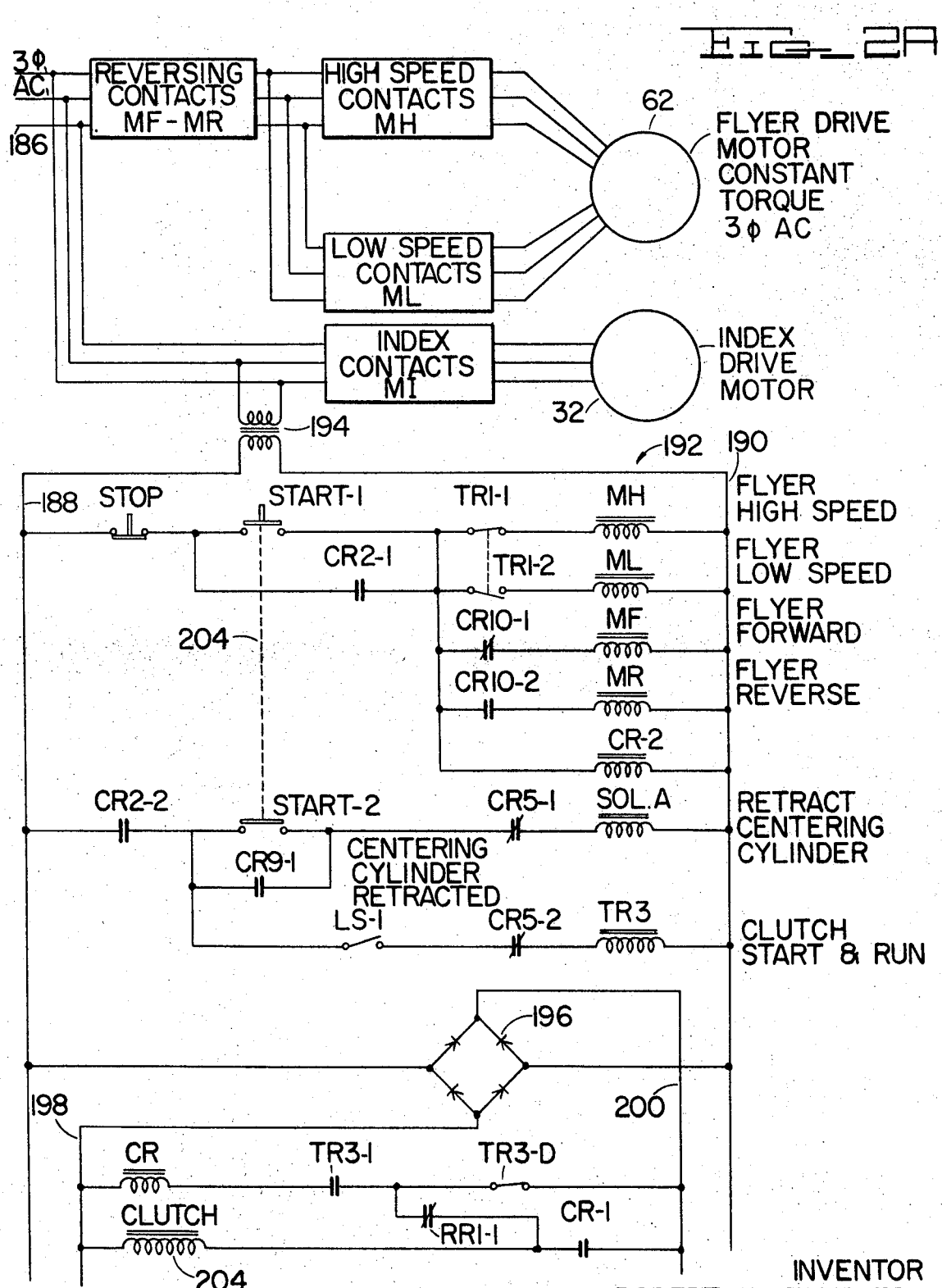

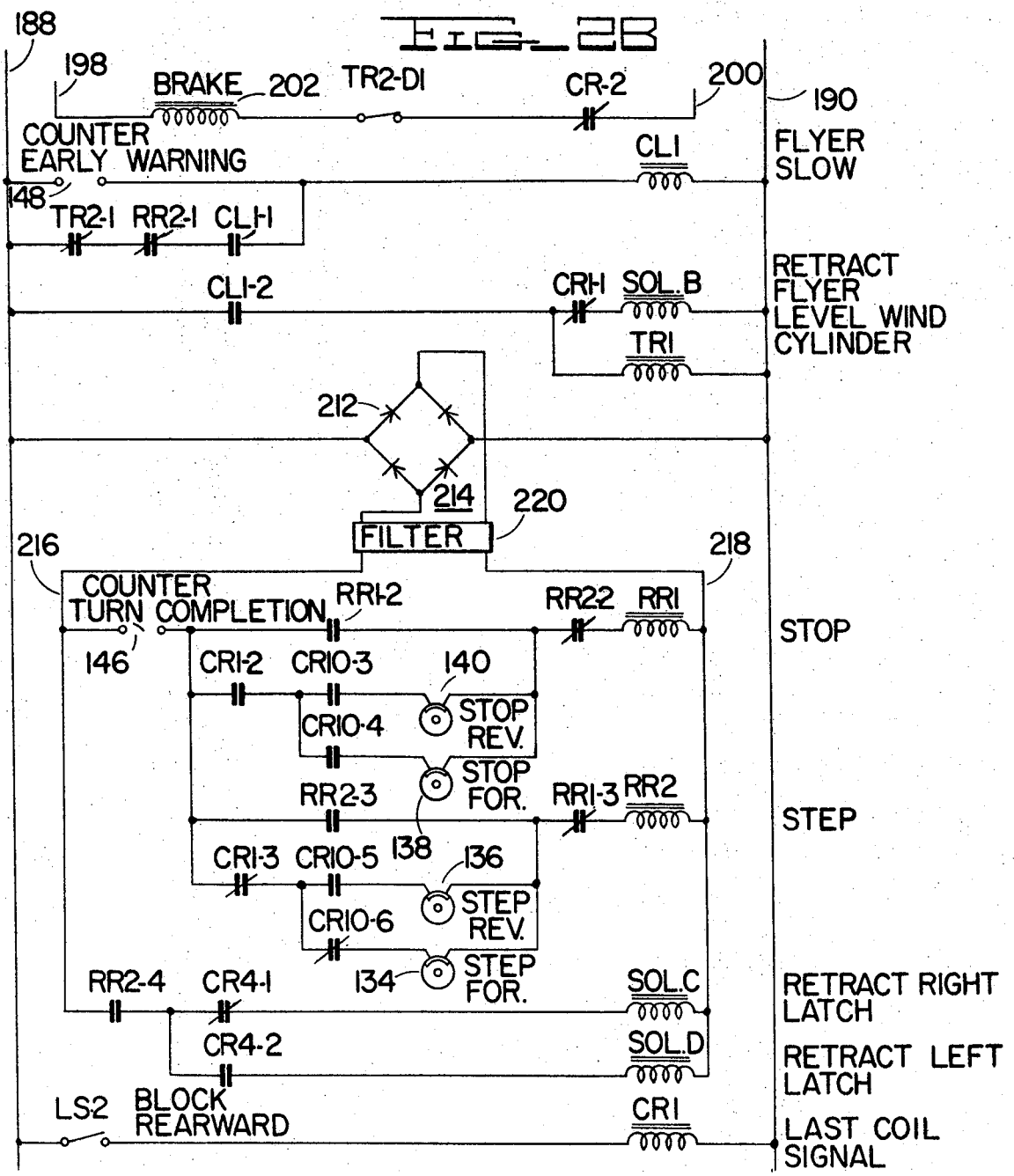

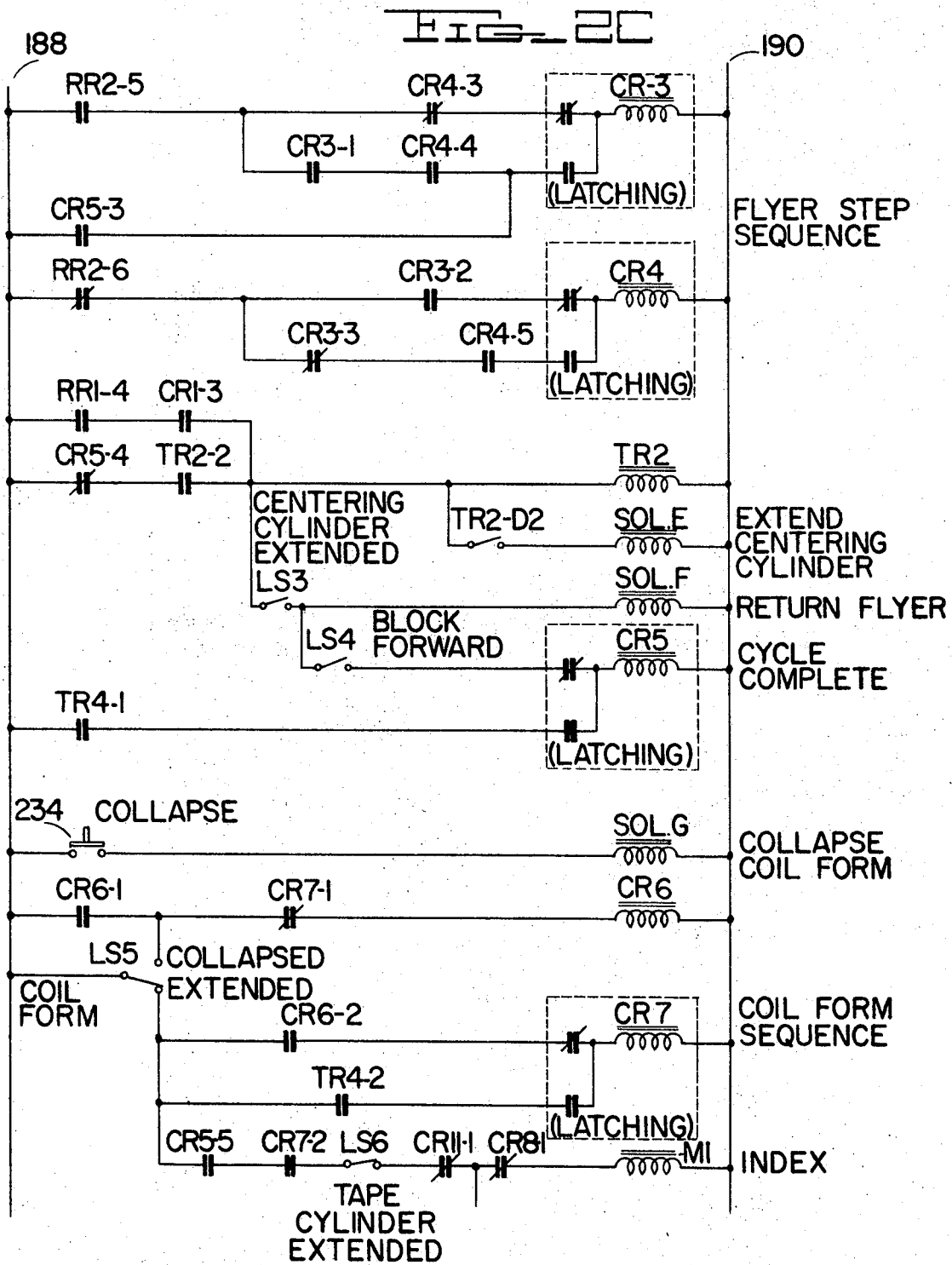

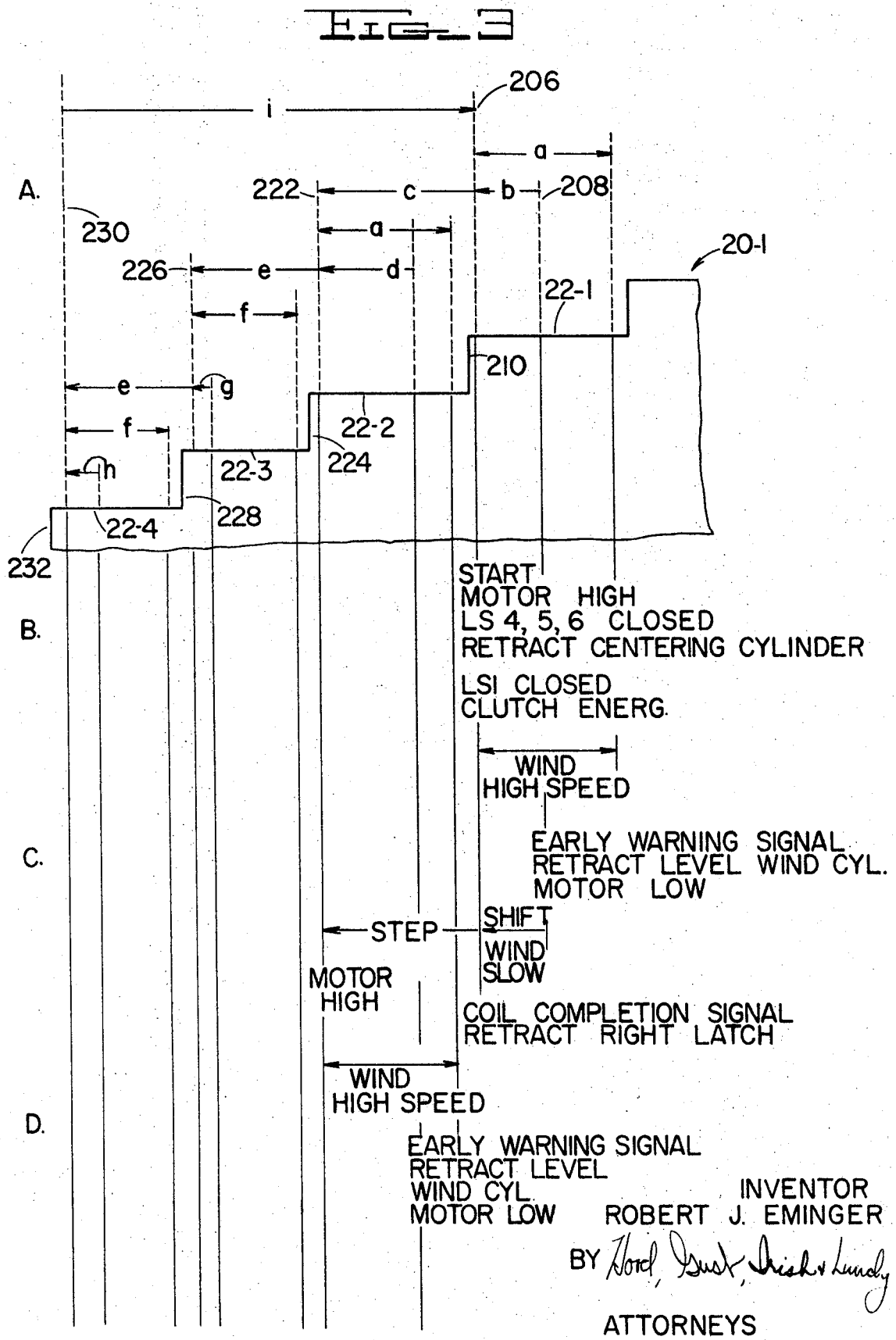

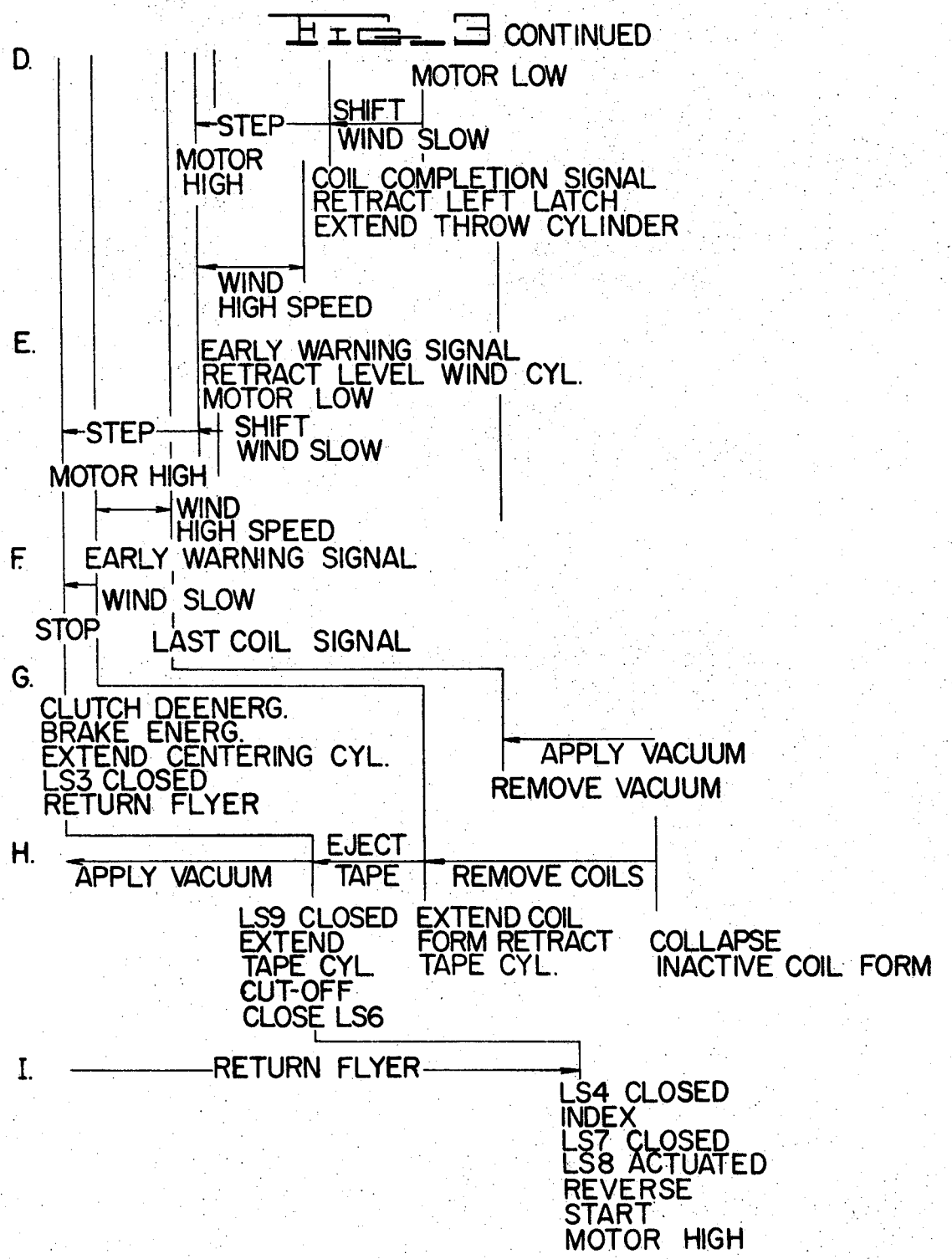

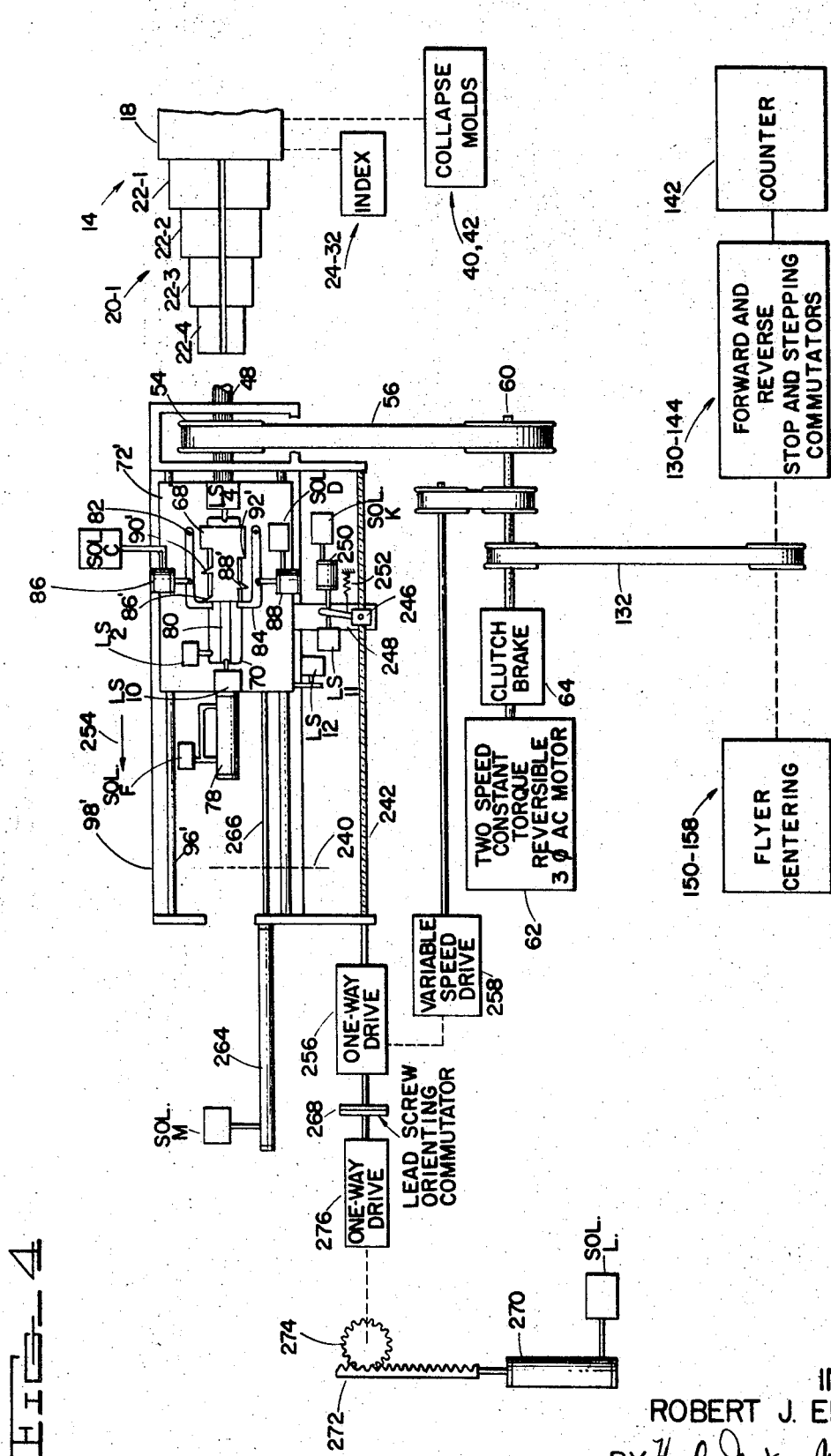

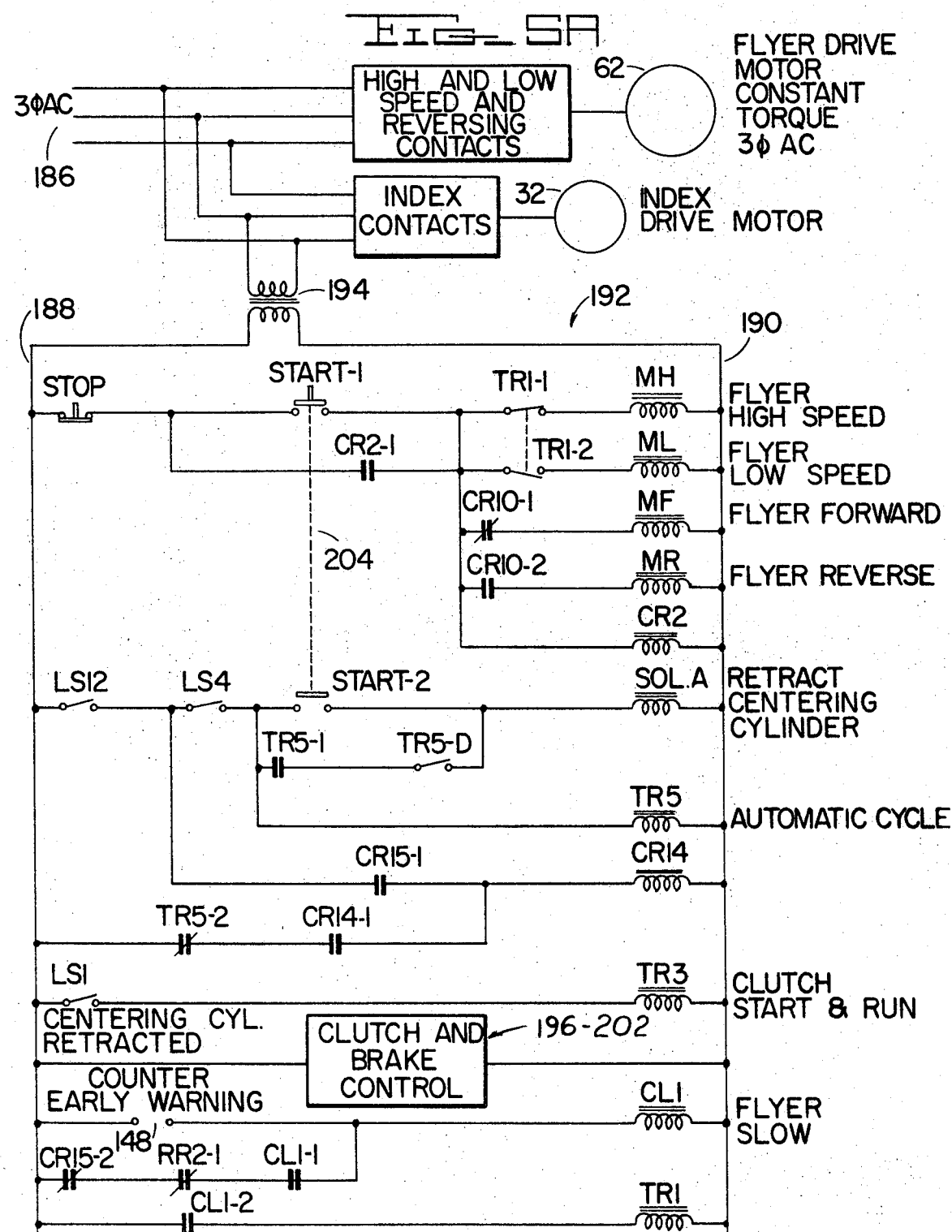

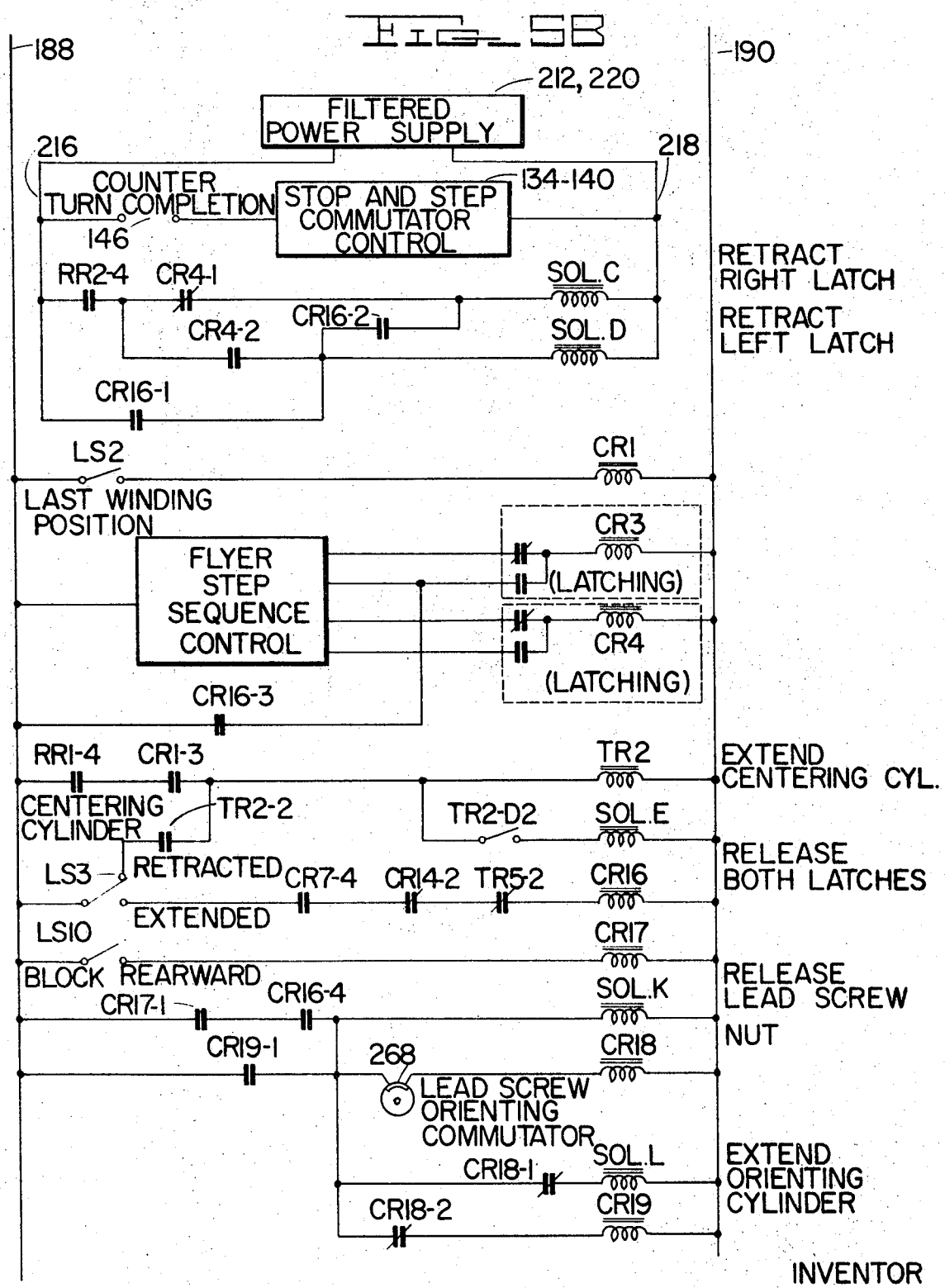

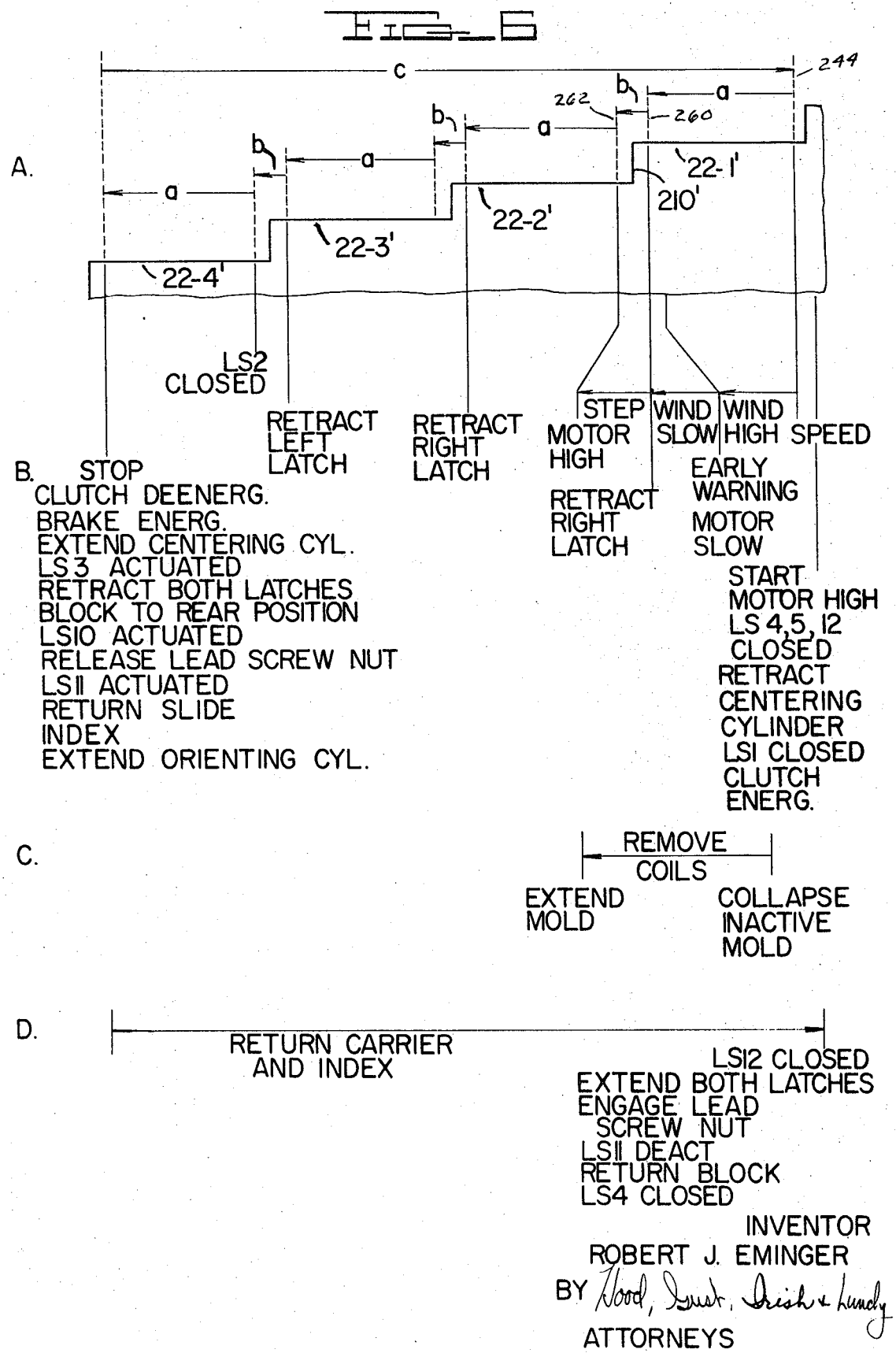

APPARATUS FOR AUTOMATICALLY WINDING CONCENTRIC DYNAMOELECTRIC MACHINE COILS

BACKGROUND OF THE INVENTION

1. Field of the Invention

This invention relates generally to prewinders for winding dynamoelectric machine coils prior to insertion of the coils in a core member, and more particularly to apparatus for automatically winding a set of at least two concentric dynamoelectric concentric coils.

2. Description of the Prior Art

Flyer-type prewinders have been provided for winding concentric dynamoelectric machine coils upon a coil form having axially extending steps of progressively smaller size. In one conventional form of such prior prewinder, the flyer is initially positioned in winding relationship with the first coil form step and then oscillated as it is rotated to level-wind a coil on the first step. At the conclusion of winding the first coil, the flyer is stopped, rotated a partial turn as required to a predetermined rotational position with respect to the coil form, moved axially to position the flyer in winding relationship with the next coil form step, and then again rotated and oscillated so as to wind the next coil. It will be readily apparent that the requirement that the flyer be stopped completely during its incremental movement from winding relationship with one coil form step to the next places a practical lower limit upon the total time required for winding a set of coils, even though the flyer is operated at relatively high speed during the winding of each coil. Efforts to shift the flyer from one coil form step to the next without stopping the flyer have met with difficulty due to the requirement that the connection between adjacent coils be accurately located at predetermined positions, thus requiring that the flyer be shifted when it is in a predetermined rotational position with respect to the coil form.

SUMMARY OF THE INVENTION

In application Ser. No. 813,798 of the present inventor, and assigned to the assignee of the present application, there is disclosed flyer-type apparatus for winding concentric dynamoelectric machine coils in which the requisite accurate location of the connections between the coils is maintained without stopping the flyer during shifting from one coil form step to the next. In order to wind a set of concentric dynamoelectric machine coils, i.e. the coils comprising one pole of a dynamoelectric field winding, without stopping the flyer between coils while still preserving the requisite accurate positioning of the inner-coil connections, it is necessary that the rotational speed of the flyer be rapidly reduced from a higher winding speed to a lower but constant speed immediately prior to completion of the particular coil, and that the flyer be nearly instantaneously shifted from one coil form step to the next, the shift occurring when the flyer is in the predetermined rotational position with respect to the coil form.

In accordance with the invention, the requisite rapid deceleration and acceleration between higher and lower constant speeds is obtained by the use of a two-speed, alternating current induction motor, deceleration from the higher winding speed to the lower flyer-shifting speed, such as from 3,000 to 1,500 r.p.m., thus being accomplished in two or three revolutions of the flyer. Further, the requisite nearly instantaneous shifting of the flyer is accomplished by electromagnetically actuated latches energized by substantially ripple-free direct current in response to means which senses the rotational position of the flyer with respect to the coil form.

It is further desirable to provide for automatically winding all of the poles of a dynamoelectric machine field winding, which necessitates indexing the coil form upon completion of the coils of each pole. It further may be required that the direction of rotation of the flyer be reversed for winding the coils of each successive poles. Still further, it may be desirable automatically to apply adhesive tape to a coil form for retaining the coils wound thereon in their completed form. The apparatus of the present invention automatically performs these additional operations.

Thus, the invention in its broader aspects provides a coil form having spaced opposite ends with at least two progressively smaller steps extending therebetween. A flyer is provided mounted on a shaft for winding a wire on the coil form steps to form the coil, and first means are provided for rotatably supporting the shaft. An electric motor is provided having at least two speeds, the motor being coupled to the shaft for rotating the same and the flyer, and a control circuit is provided including first control means for selectively energizing the motor for high and low speed operation. Second means is provided for supporting the first support means, and the shaft and flyer for longitudinal movement parallel with the axis of the shaft, and first means is provided on the second support means and operatively connected to the first support means for selectively, sequentially moving the first support means, shaft and flyer from a forward to a rear position in at least one incremental step thereby respectively to position the flyer in winding relationship with the coil form steps. Second means is provided operatively coupling the motor to the second support means for moving the same and the first support means, shaft and flyer longitudinally parallel with the axis of the shaft thereby to traverse the flyer with respect to the coil form. Means are provided for selectively positioning the first support means, shaft and flyer at an initial location with the first support means in its forward position and with the flyer in winding relationship with the coil form step adjacent one end of the coil form. Means are provided for counting the number of revolutions of the shaft and flyer thereby to count the number of turns of the respective coils. Means are provided for initially actuating the first control means to energize the motor for high speed operation thereby to wind a first coil on a first coil form step at high speed. The control circuit further includes second control means responsive to the counting means for actuating the first control means to energize the motor for low speed operation in response to winding a first predetermined number of turns of the first coil, and third control means responsive to the counting means for actuating the first moving means to move the first support means, shaft and flyer by a first incremental step from its forward position to a second position with the flyer located in winding relationship with the second coil form step adjacent the first coil form step in response to a second predetermined number of turns of the first coil greater than the first number and corresponding to completion of the first coil. The third control means is coupled to the first control means and actuates the same to energize the motor for high speed operation in response to the second number thereby to initiate winding of a second coil on the second coil form step at high speed.

It is accordingly an object of the present invention to provide improved apparatus for automatically winding a set of at least two concentric dynamoelectric coils.

Another object of the present invention is to provide improved flyer-type apparatus for automatically winding a set of at least two concentric dynamoelectric coils without stopping the rotation of the flyer between coils.

BRIEF DESCRIPTION OF THE DRAWINGS

FIG. 1 is a diagrammatic illustration of one embodiment of the invention in which each coil is level-wound upon the respective coil form step, and further illustrating the coil form-indexing and adhesive tape-applying features of the invention;

FIG. 2 is a circuit diagram illustrating the automatic control system of the apparatus of FIG. 1;

FIG. 3 is a timing diagram useful in explaining the cycle of operation of the apparatus of FIGS. 1 and 2;

FIG. 4 diagrammatically illustrates a second embodiment of the invention in which the coils are single layer-wound upon the coil forms;

FIG. 6 is a timing diagram useful in explaining the cycle of operation of the apparatus of FIGS. 4 and 5.

DESCRIPTION OF THE PREFERRED EMBODIMENTS

Level-Wind Embodiment

Figure 20:
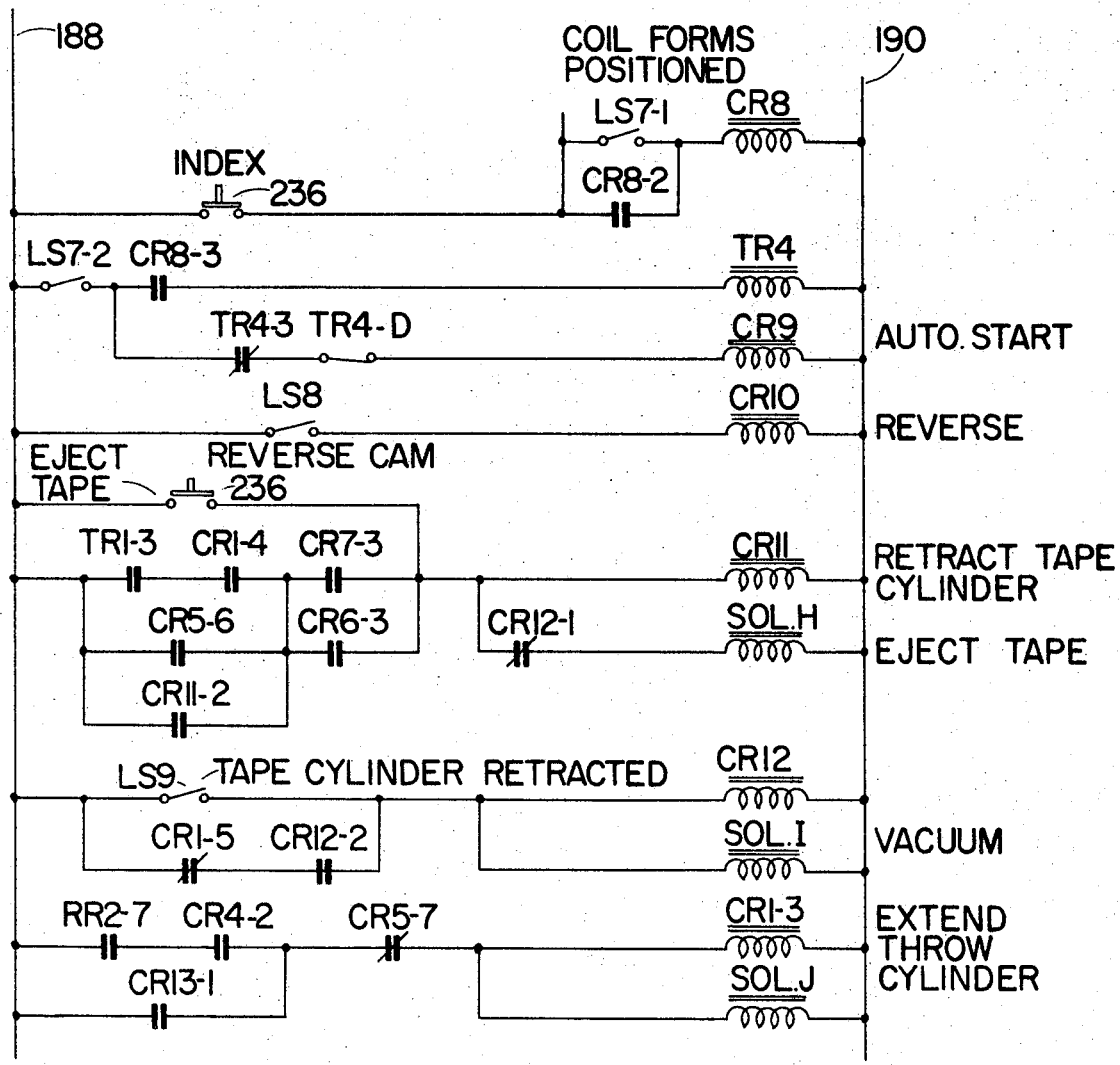

Referring now to FIG. 1 of the drawings, the apparatus of the invention for automatically level-winding concentric dynamoelectric machine coils, generally indicated at 10, comprises a flyer winder assembly 12, a coil form assembly 14, and an adhesive tape-applying assembly 16. Coil form assembly 14 14 comprises a block 18 having a plurality of stepped, radially displaced, collapsible coil forms 20 thereon. In the illustrated embodiment, coil form assembly 14 has four coil forms 20 thereon equally spaced around block 18 by 90°, only three of which 20-1, 20-2 and 20-3 are shown. Each of the coil forms 20 is shown as comprising four steps 22-1, 22-2, 22-3 and 22-4, the forward steps 22-1 and 22-2 having a first axial length and the rear steps 22-3 and 22-4 having a second, shorter axial length. As used herein, "forward" refers to a direction extending toward the block 18, whereas "rear" and "rearward" refer to a direction extending toward the flyer assembly 12.

Block 18 and the stepped coil forms 20 supported thereon are mounted for rotational movement by means of a shaft 24 journaled in a frame element 26. Shaft 24, block 18 and coil forms 20 are rotated thereby to index the coil forms from one position to the next by means of gear 28 and shaft 24 driven by pinion 30 on the shaft of a suitable index motor 32. In the embodiment illustrated in FIG. 1, coil form 20-1 is shown at a winding station, coil form 20-2 is at an unloading station, and coil form 20-3 is at a tape applying station, the fourth coil form diametrically opposite coil form 20-2 being at an inactive station.

Each of the coil forms 20 comprises an upper, fixed part 34 and a lower movable part 36. The two parts 34, 36 are normally retained in their expanded position by suitable springs 38. The coil forms are collapsed by extension of piston rod 40 of a conventional pneumatic cylinder 42 supported on frame element 26, extension of piston rod 40 engaging the movable part 36 of the respective coil form 20 and moving it upwardly against spring 38 thereby collapsing the respective coil form so as to permit removal of the coils therefrom. For illustrative purposes, cylinder 42 is shown in FIG. 1 as being located to collapse coil form 20-3 at the tape-applying station, however it will be understood that if the coil unloading station is located intermediate the winding and tape-applying stations, cylinder 42 would be located in alignment with coil form 20-2. A suitable limit switch, identified as LS5, senses retraction and extension of piston rod 40 of cylinder 42, and thus extension and collapse respectively, of the respective coil form 20, as will be hereinafter more fully described. A suitable cam 44 driven by shaft 24 cooperates with a suitable limit switch, identified as LS7, to provide an indication of proper positioning of the coil forms 20 with each of the coil forms at a respective station.

Flyer apparatus 12 comprises a conventional flyer 46 for winding the wire 48 on the respective coil form step 22 of the coil form 20 at the winding station. Flyer 46 is mounted on a splined shaft 48 supported for rotational and axial movement by suitable bearings mounted on frame elements 50 and 52. Shaft 48 and flyer 46 are rotatably driven by means of pulley 54 having a splined connection with shaft 48. Pulley 54 is, in turn, driven by belt 56 and pulley 58 on shaft 60. Shaft 60 and pulley 58 are driven by a two-speed, constant torque, reversible, three-phase, alternating current, induction motor 62 through a conventional clutch-brake 64, as will hereinafter be described.

The end of splined shaft 48 remote from flyer 46 is rotatably attached to projection 66 on block 68. Projection 66 extends downwardly through a slot 70 in slide 72 which supports block 68 for longitudinal movement in a direction parallel with the axis of shaft 48 between forward and rear positions defined, respectively, by the limit switches identified as LS4 and LS2, block 68 being shown in its forward position in FIG. 1 with flyer 46 thus located in winding relationship with the largest step 22-1 of the respective coil form 20 adjacent block 18. It will thus be seen that rearward movement of block 68 will be accompanied by rearward movement of splined shaft 48 and flyer 46 in the direction shown by the arrow 74.

It will be readily understood that splined shaft 48 has an axially extending opening therethrough through which wire 49 extends, the wire thus being withdrawn from a conventional supply shown by the dashed lines 76.

A conventional pneumatic cylinder 78 is mounted on slide 72 and has its piston rod 80 connected to block 68. A suitable solenoid valve, identified as solenoid F is coupled to cylinder 78 and normally actuates the same to bias block 68, splined shaft 48 and flyer 46 MH in the direction as shown by the arrow 74. Rearward movement of block 68, shaft 48 and flyer 46 is selectively restrained by a pair of latch members 82 and 84 pivotally mounted on slide 72 and cooperatively engaging abutments 86, 88, 90 and 92 on block 68. In the illustrated embodiment, abutments 86, 88, 90 and 92 are respectively axially spaced apart on block 68 by distances corresponding to the respective axial lengths of the steps 22-1, 22-2, 22-3 and 22-4 of the coil forms 20. It will be observed that with block 68 in its forward position as shown in FIG. 1, latch 82 engages abutment 86 thereby retaining block 68 in its forward position, thus locating flyer 46 in winding relationship with the forward coil form step 22-1.

Latches 82, 84 are respectively actuated by conventional pneumatic cylinders 87, 89 mounted on slide 72, cylinders 87, 89 in turn being respectively actuated by solenoid valves respectively identified as solenoid C and solenoid D. Thus, it will be seen that actuation of solenoid C and cylinder 87 will pivot latch 82, referred to as the "right latch" away from abutment 86 with the result that cylinder 78 will move block 68, splined shaft 48 and flyer 46 rearwardly in the direction shown by arrow 74 until abutment 88 engages latch 84, thereby locating flyer 46 in winding relationship with the next coil form step 22-2. Similarly, actuation of solenoid D and cylinder 89 will result in pivotal movement of latch 84, referred to as the "left latch" away from abutment 88 so that cylinder 78 moves block 68, splined shaft 48 and flyer 46 rearwardly until latch 82 engages abutment 90, thereby locating flyer 46 in winding relationship with the next coil form step 22-3. Finally, actuation of solenoid C and cylinder 87 will result in pivotal movement of latch 82 away from abutment 90 with the result in pivotal movement of latch 82 away from abutment 90 with the result that cylinder 78 will move block 68, splined shaft 48 and flyer 46 move rearwardly until latch 84 engages abutment 92 with flyer 46 thus located in winding relationship with the smallest coil form step 22-4. As will hereinafter be described, actuation of solenoid F will reverse the application of air to cylinder 78 thereby to return block 68, splined shaft 48 and flyer 46 from its rear position to its forward position, in the direction shown by the arrow 90, thereby again to locate flyer 46 in winding relationship with the largest coil form step 22-1.

As indicated above, it is important that the axial stepping of flyer 46 from one coil form step to the next be accomplished nearly instantaneously, which in turn requires extremely rapid actuation of latches 82, 84 by pneumatic cylinders 87, 89 Rapid actuation of a pneumatic cylinder is inhibited by the presence of moisture and/or oil in the high pressure air supplied thereto. Thus, in accordance with the invention, solenoids C and D are coupled to high pressure air supply line 92 by a suitable filter 94 for removing moisture and oil from the high pressure air. It will be readily understood that cylinders 87, 89 are of the air-actuated, spring return type. Thus, actuation of a respective solenoid valve C or D will admit high pressure air to the respective cylinder to retract its piston rod, thus pivoting the respective latch 82, 84 out of engagement with the respective abutment, while deactuation of the respective solenoid valve C or D thereby terminating the application of high pressure air will result in immediate extension of the piston rod, of the respective cylinder under the influence of its internal spring thereby immediately to return the respective latch 82, 84 to its restraining position.

The slide 72 is mounted for axial movement parallel with the axis of shaft 48 by means of suitable rails 96 mounted on frame element 98. Slide 72 is moved axially in oscillatory fashion, as shown by the arrow 100, by mechanism 102 now to be described which provides two different axial lengths of coil form steps 22-1, 22-2, and 22-3, 22-4. Thus, with block 68, splined shaft 48, and flyer 46 positioned, as above-described, with flyer 46 in winding relationship with either of the longer coil form steps 22-1 or 22-2, oscillation of slide 72 with the longer of its two throws via mechanism 102 will result in corresponding oscillation of block 68, splined shaft 48 and flyer 46 thereby to level-wind wire 49 on the respective coil form step 22-1 or 22-2. Similarly, with block 68, shaft 48 and flyer 46 positioned with flyer 46 located in winding relationship with either of the shorter coil form steps 22-3 or 22-4, oscillation of slide 72 with its shorter throw via mechanism 102 will result in oscillation of block 68, splined shaft 48 and flyer 46 thereby to level-wind wire 49 on the respective shorter coil form step 22-3 or 22-4.

Throw shift mechanism 102 comprises a lever member 104 pivotally connected to bracket 106. Pivoted lever 104 has one slotted end 108 coupled to slide 72 and its opposite slotted end 110 coupled to actuating member 112. Bracket 106 is connected to piston rod 114 of pneumatic cylinder 116 actuated by a solenoid valve, identified as solenoid J. Actuating member 112 is oscillated reciprocally by means of a heart-shaped cam 118 cooperating with a cam follower 120 on member 112. Heart-shaped cam is driven by a selectively variable speed drive 122 which, in turn, is driven by drive shaft 60. Cam follower 120 is normally biased into engagement with heart-shaped cam 118 by extension of piston rod 124 of pneumatic cylinder 126. It will thus be seen that the reciprocal motion imparted to actuating member 112 by rotation of heart-shaped cam 118 will result in the reciprocal oscillatory motion of slide 72 with a throw depending upon the position of pivoted lever 104. Lever 104 is shown in its lower position in FIG. 1 with piston rod 114 of cylinder 116 retracted, thus imparting the longer throw to the oscillatory motion of slide 72 for level-winding the coils on the longer coil form steps 22-1 and 22-2. It will further be seen that the extension of piston rod 114 of cylinder 116 responsive to actuation of solenoid J will move pivoted lever 104 to its upper position thereby providing the shorter throw for slide 72 for level-winding coils on the shorter coil form steps 22-3 and 22-4. It will be readily understood that the throw-selecting mechanism 106, 114, 116 with the throw-selecting solenoid J may be eliminated where the coil form steps 22 are all of the same axial length.

As will hereinafter be more fully described, it is desirable that close to the end of winding a coil on a respective coil form step, the flyer 46 be moved axially rearwardly from whatever location it is in at the time by reason of the oscillatory motion of slide 72, to a point adjacent the rear end of the respective coil form step 22. In order to provide this movement, cylinder 126 is actuated by a solenoid valve, identified as solenoid B, to retract its piston rod 124 thereby moving actuating member 112 in the direction shown by the arrow 128, so as to move cam follower 120 away from heart shaped cam 118, thus moving slide 72 to the rear extremity of its throw so as to position flyer 46 adjacent the rear end of the respective coil form step. Deactuation of solenoid B reverses the application of high pressure air to cylinder 126 so as to bias its piston rod 124 outwardly again to urge cam follower 120 into engagement with its heart-shaped cam 118.

As indicated above, it is desired that the connections between adjacent coils wound on the coil form steps 22 be accurately located at predetermined positions, and thus it is desired that the flyer 46 have a predetermined rotational position with respect to the respective coil form 20 when it is moved rearwardly by an incremental step into winding relationship with the next smaller coil form step. Further, it is desired that the flyer have a predetermined rotational position with respect to the respective coil form 20 upon completion of a respective set of coils. These predetermined rotational positions may be at different locations for the forward and reverse directions of rotation of flyer 46.

In order to provide for stepping and stopping of flyer 46 at the desired rotational position with respect to the respective coil form 20 in each direction of rotation, a timing shaft 130 is provided driven from shaft 20 by appropriate pulleys and belt 132. Forward and reverse stepping commutators 134, 136, and forward and reverse stopping commutators 138, 140 are mounted on shaft 130 and with cooperating contacts control the timing of the stepping and stopping operations, as will be hereinafter described. It will be understood that timing shaft 130 is driven at the same rotational speed as flyer 46. The number of revolutions of flyer 46 and thus the number of turns wound upon the respective coil form steps 22 are counted by a conventional counter 142 which counts the number of revolutions of timing shaft 130 by means of a conventional photoelectric device 144. Counter 142 is conventional and includes appropriate means for presetting the number of turns to be wound on each of the coils of the set, four as shown in FIG. 1, and thus provides a signal across its turn-completion output terminals 146 in response to completion of the predetermined number of turns in each of the coils. Further, counter 142 provides across its early warning terminals 148 a signal a predetermined number of turns in advance of completion of a respective coil, such as four turns, that signal persisting until completion of the respective coil.

It is further desired positively to rotationally locate the flyer 46 and timing shaft 130 prior to commencement of winding each new set of coils. In order to provide this positive rotational location, a centering disc 150 is provided on the end of timing shaft 130 and having diametrically opposite rollers 152 projecting therefrom. A pivoted lever member 154 is provided actuated by a piston rod 156 of pneumatic cylinder 158. Actuation of a solenoid valve, identified as solenoid A provides retraction of piston rod 156 and movement of lever member 154 away from cooperative engagement with rollers 152, whereas actuation of a solenoid valve, identified as solenoid E results in extension of piston rod 156 and movement of lever member 154 into cooperative engagement with rollers 152. It will readily be seen that if the disc 150 is rotationally positioned so that rollers 152 are located as shown by the dashed lines, extension of piston rod 156 and radially inward movement of pivoted lever member 154 will result in engagement of lever member 154 with one or the other of the rollers 152 thereby positively to rotate disc 150, to the position shown in FIG. 1, thereby rotating timing shaft 130, splined shaft 48 and flyer 46 to the desired rotational position. The retracted and extended positions of piston rod 156 of centering cylinder 158, and thus the retracted and extended positions of pivoted lever member 154 are sensed by limit switches identified as LS1 and LS3 respectively. Reversing of motor 62 and thus the direction of rotation of flyer 46 for winding successive sets of coils in opposite directions is controlled by a suitable cam 160 on index shaft 24, and a cooperating limit switch, identified as LS8.

In order to provide for the application of adhesive tape to the coil forms 20 prior to the winding of coils thereon, and for retention of the tape thereon until winding of at least some of the coils, each of the coil forms 20 has an axially extending, upwardly facing slot 162 formed in its upper part 34. Each of the slots 162 has a vacuum conduit 164 communicating therewith, only one of which is shown in FIG. 1. The four vacuum conduits 164 extend downwardly through index shaft 24 and communicate with a rotary manifold 166 coupled to a vacuum supply line 168 by as solenoid-actuated vacuum valve, identified as, solenoid I. Manifold 166 is arranged to apply vacuum to each of the conduits 164, other than the conduit associated with the coil form 20-2 at the unloading station.

Tape applying mechanism 16 comprises a source 170 of tape 172 having adhesive on its outer side 174, i.e. the side which faces outwardly when the tape is positioned in slot 162, so that the tape will adhere to the under surfaces of the turns of wire forming the coils. A suitable length of tape 172 is injected into the slot 162 by rollers 176 driven by gear 178 and cooperative rack 180. Rack 180 is in turn actuated by a pneumatic cylinder 182 which, in turn, is actuated by a suitable solenoid valve, identified as solenoid H. Retraction of rack 180 by cylinder 182 results in ejection of tape 172 by rollers 176 into the slot 162. Return of rack 180 to its extended position, as shown in FIG. 1 actuates cutoff mechanism 184 to sever tape 172. The retracted and extended positions of tape ejection cylinder 182 and rack 180 are respectively sensed by limit switches LS6 and LS9.

Referring now additionally to FIG. 2, the flyer drive motor 62, which as indicated is preferably a two-speed, constant torque, three-phase, alternating current induction motor, is energized from a source 186 of three-phase alternating current, by reversing contacts MF and MR, and by high and low speed contacts MH and ML. Index drive motor 32, which may also be a conventional three-phase, alternating current induction motor, is energized from source 186 through contact MI. Lines 188, 190 of control circuit 192 are energized by control transformer 194 from one phase of source 186.

It will now be assumed that the apparatus of FIG. 1 is positioned to initiate winding of a set of coils on coil form 20–1, block 68 being in its forward position thus locating flyer 46 in winding relationship with the largest coil form step 22–1. In this preliminary condition of the apparatus, centering cylinder 158 is extended thus retaining flyer 46 in the desired position against accidental displacement. Further, in this condition, solenoid B is deenergized and the piston rod 124 of level wind cylinder 126 is extended to urge cam follower roller 120 against heart-shaped cam 118.

Rectifier 196 coupled across control lines 188, 190 supplies direct current to lines 198, 200 and solenoid 202 of clutch-brake 64 is energized through normally closed time delay relay contacts TR2–D1 and normally closed relay contacts CR–2. Manually actuated START switch 204 is now momentarily depressed, simultaneously momentarily closing START–1 and START–2 switch contacts. Closing START–1 switch contacts energizes the operating coil of the high speed contacts MH through the normally closed STOP switch and the normally closed contacts of relay TR1–1. The operating coil of the forward contacts MF is also energized through the normally closed contacts of control relay CR10–1, and the operating coil of control relay CR2 is energized closing its contacts CR2–1 to seal-in the MH MF and CR2 operating coils. Drive motor 62 is thus energized at its high speed in the forward direction.

Energization of control relay CR2 also closes its contacts CR2–2 and thus momentary closing of the START–2 switch contacts energizes solenoid A through normally closed control relay contacts CR5–1 thereby to retract the centering cylinder 158. Upon closing of limit switch LS1 responsive to retraction of centering cylinder 158, the operating coil of time delay relay TR3 is energized through normally closed relay contact CR5–2.

Energization of the TR3 operating coil immediately closes its contacts TR3–1 thereby energizing the operating coil of control relay CR through the normally closed time delay contacts TR3–D, which open after a predetermined time delay following energization of the TR3 operating coil. Energization of coil relay CR closes its contacts CR–1 thus sealing in the CR operating coil through the normally closed stepping reed relay contact RR1–1. Closing of control relay contact CR–1 energizes the clutch solenoid 204, and simultaneous opening of contacts CR–2 deenergizes the brake coil 202. With the clutch portion of clutch-brake 64 thus energized, flyer 46 is rotated at high speed thereby to wind the first coil on the largest coil form step 22–1, as above-described.

Referring briefly to FIG. 3A it will be seen that flyer 46 is initially located somewhere in winding relationship with coil form step 22–1, assumed to be as shown by the dashed line 206. At this point, drive motor 26 is energized for high speed operation, limit switches LS4, 5 and 6 are closed, centering cylinder 158 is retracted closing limit switch LS1, clutch coil 204 is energized, and the flyer then winds the coil on step 22–1 at high speed, being traversed back and forth across step 22–1 by the oscillatory motion of slide 72 imparted by cam 118 with a throw indicated by the arrows $a$.

A predetermined number of turns in advance of completion of the desired number of turns of the coil on step 22–1, a signal is provided across early warning terminals 148 of counter 142 which energizes the operating coil of relay CL1, closing its contacts CL1–1 thereby sealing in the operating coil through the normally closed time delay relay contacts TR2–1 and the stopping relay contacts RR2–1. It will be understood that the early warning signal, normally appearing about three of four turns in advance of completion of the respective coil, may occur when flyer 46 is in any position in its oscillatory traversing motion $a$, it being assumed in FIG. 3A that the early warning signal occurs when the flyer 46 is located as shown by the dashed line 208.

Energization of relay CL1 in response to the early warning signal closes its contacts CL1–2 to energize solenoid B through normally closed control relay contacts CR1–1 and also to energize the operating coil of time delay relay TR1. Energization of solenoid B retracts the level-wind cylinder 126 and actuates lever 112 thereby moving cam follower roller 120 away from cam 118 and moving slide 72 to its extreme rearward position thereby moving flyer 46 rearwardly to a point adjacent the rear edge 210 of step 22–1, as shown by the dashed line 206, the movement of the flyer to a point adjacent the rear edge of the step 22–1 being shown by the arrow $b$. Energization of the operating coil of time delay relay TR1 opens its contacts TR1–1 to deenergize the high speed contacts MH and closes its contacts TR1–2 to energize the low speed contacts ML, thus energizing the drive motor 62 for low speed operation. Flyer 46 is thus rotated at low speed during the remaining few turns of the coil on step 22–1.

As previously indicated, main drive motor 62 is preferably a two speed, constant torque, three-phase, alternating current induction motor. In a specific embodiment of the invention, the high speed of the flyer was 2900 r.p.m. and the low speed was one-half of the high speed, i.e. 1450 r.p.m. Such a motor is employed by reason of its extremely rapid deceleration and acceleration between its high and low speeds, i.e. such a motor will decelerate from its high to its low speed in about two revolutions, and likewise accelerate from its low speed to its high speed in about two revolutions. This rapid deceleration and acceleration is provided in such a motor by reason of the fact that when the coils of its field winding are reconnected to provide the proper number of poles for high speed or low speed operation, as the case may be, very substantial braking or accelerating torque is provided, as the case may be, which affirmatively and positively brings the motor down to or up to the different speed. Other types of two speed motors require a substantially longer time for deceleration and/or acceleration from one speed to the other.

As pointed out above, it is desired that the stepping of the block 68 and the flyer 46 from one coil form step to the next be accomplished nearly instantaneously and with the flyer having a predetermined rotational position with respect to the coil form so as to locate the intercoil connections. To this end, rectifier 212 is coupled across alternating current control lines 188, 190 and has its output 214 coupled to direct current control lines 216, 218 through a conventional filter network 220 which supplies highly filtered, substantially ripple-free direct current to direct current control lines 216, 218. It will now be observed that the turn completion terminals 146 of counter 142 are coupled in series with the operating coil of stepping reed relay RR2 through normally closed control relay contacts CR1–3, normally closed relay contacts CR10–6, the forward stepping commutator 134, and the normally closed stopping reed relay contacts RR1-3. Thus, upon appearance of a turn completion signal across terminals 146 of counter 142 indicating the desired number of turns have been wound on coil form step 22-1, and when the forward stepping commutator 134 has rotated to complete the circuit through its cooperative contacts thus indicating that the flyer 46 is in the desired rotational position with respect to coil form 22-1, the operating coil of reed relay RR2 will be energized. Energization of reed relay RR2 closes its contacts RR2-4 to energize solenoid C through normally closed control relay contacts CR4-1, thus actuating cylinder 86 and retracting the right latch 82 to permit cylinder 78 immediately to move block 68, splined shaft 48 and flyer 46 rearwardly until the left latch 84 engages abutment 88. By reason of the energization of solenoid C with substantially ripple-free direct current, and the filtering of the air supply to cylinders 87, 89, this retracting of the right latch 82 and the consequent rearward movement of flyer 46 by one incremental step occurs nearly instantaneously, the flyer axially rotating less than one-quarter of a turn during the stepping operation.

Referring now briefly to FIG. 3C, retraction of the right latch 82, as above-described and the consequent rearward movement of block 68 by one incremental step moves flyer 46 rearwardly from the location shown by the dashed line 206 to the location shown by the dashed line 222 adjacent the rear edge 224 of the next smaller coil form step 22-2 and therefore in winding relationship therewith.

Energization of the stepping reed relay RR2 opened its contacts RR2-1 in series with the operating coil of relay CL1, thus breaking the sealing circuit for that relay and deenergizing relay CL1. Deenergization of relay CL1 opened its contacts CL1-2 deenergizing solenoid B and time delay relay TR1. Deenergization of solenoid B reverses the application of air to the level-wind cylinder 126 thus again urging actuating member 112 forwardly to urge cam follower roller 120 against cam 118 thereby to resume the oscillatory motion of slide 72 to traverse flyer 46 back and forth across coil form step 22-2 with the throw a. Deenergization of the operating coil of time delay relay TR1 closes its contacts TR1-1 again to energize the high speed contacts MH and opens its contacts TR1-2 to deenergize the low speed contacts ML so that main drive motor 62 is again energized for high speed operation and the flyer 46 is operated at high speed in the forward direction to wind the next coil on coil form step 22-2 having the predetermined number of turns as set in the turns counter 142.

Energization of reed relay operating coil RR2 upon completion of the first coil on the first coil form step 22-1 closed its contacts RR2-5 thus energizing the operating coil of latching relay CR3 through the normally closed latching relay contacts CR4-3, latching relay CR3 thus being latched with all of its contacts in their actuated conditions. Upon termination of the counter signal across terminals 146, reed relay RR2, which was sealed in through its contact RR2-3, is deenergized again closing its contact RR2-6 to energize latching relay CR4 through the now-closed latching relay contacts CR3-2, relay CR4 thus latching to its actuated position opening its contacts CR4-1 and closing its contacts CR4-2 and CR4-5. It will now be seen that with latching relay contact CR4-1 opened and CR4-2 closed, the next energization of the stepping reed relay RR2 closing its contacts RR2-4 will energize the operating coil of solenoid D thereby to actuate the left latch 84.

Upon appearance of the early warning signal a predetermined number of turns in advance of completion of the second coil on coil form step 22-2, solenoid B is again actuated to retract the level-wind cylinder 126 so as to move flyer 46 to position 222 adjacent the rear end 224 of step 22-2, as shown by the arrow d, and main drive motor 62 is again energized from its high to its low speed operation to wind the remaining turns of the coil at low speed, as shown in FIG. 3D. Upon appearance of the turn completion signal across counter terminals 146 signifying completion of the desired number of turns on coil form step 22-2, and upon completion of the circuit by the forward step commutator 134 thereby energizing reed relay RR2 and closing its contacts RR2-4, solenoid D is now energized to actuate cylinder 89 to retract the left latch 84 to permit cylinder 78 to move block 68 rearwardly until the right latch 82 engages abutment 90, thereby moving flyer 46 rearwardly to the position shown by the dashed line 226 adjacent the rear edge 228 of coil form step 22-3. Since step 22-3 is axially shorter than steps 22-1 and 22-2, the stepping distance of block 68 and flyer 46, as indicated by the arrow e determined by the axial spacing between abutments 88 and 90 on block 68, is shorter than the stepping distance c determined by the axial distance between abutments 86 and 88.

It being recalled that both control relays CR3 and CR4 are in their latched positions, closing of reed relay contacts RR2-5 will energize control relay CR3 to unlatch the same through the now-closed contacts CR3-1 and CR4-4, thus opening CR3-3. Closing of the reed relay contacts RR2-6 upon termination of the stepping signal will energize control relay CR4 to unlatch the same through the normally closed contacts CR3-3 and the still-closed contacts CR4-5. Unlatching of relay CR4 will again close its contacts CR4-1 and open its contacts CR4-2 so that the next stepping signal signifying completion of the coil on the coil form step 22-3 will again energize solenoid C to retract the right latch 82.

Referring now to the bottom portion of FIG. 2, with control relay CR4 latched following completion of the first coil, as above described, the next energization of reed relay RR2 upon completion of the winding of the coil on coil form step 22-2 closing contacts RR2-7 will energize control relay CR13 through normally closed control relay contact CR5-7. Solenoid J is simultaneously energized to extend the throw cylinder 116 thereby moving pivoted lever 104 to provide the shorter throw for the oscillatory motion of slide 72 during winding of the coils on the next two axially shorter coil form steps 22-3 and 22-4. Energization of control relay CR13 closes its sealing contacts CR13-1 thus sealing in relay CR13 and solenoid J.

Upon stepping of the flyer 46 to position 226 in winding relationship with coil form step 22-3, the solenoid B is again deenergized to extend the level-wind cylinder 126 to resume traversing of the flyer with the now shorter throw f and main drive motor 62 is again energized for high speed operation thereby to wind the coil on coil form 22-3 at high speed, as above described. Upon occurrence of the early warning signal across counter terminals 148 the predetermined number of turns in advance of completion of winding of the coil on step 22-3, solenoid B is again energized to retract the level-wind cylinder 126 thereby again to shift the flyer to the rear position 226 and the motor is energized for low speed operation during the remaining turns, all as above described and as shown in FIG. 3E. Upon occurrence of the turn completion signal across counter terminals 146 signifying completion of the winding of the coil on step 22-3 and upon completion of the circuit by the forward stepping commutator 134 thereby energizing reed relay RR2, solenoid C is again energized to actuate cylinder 87 to retract the right latch 82 to permit cylinder 78 to move block 68 rearwardly until latch 84 engages abutment 92, thereby to step flyer 46 rearwardly by distance e to the position as shown by the dashed line 230 adjacent the rear end 232 of the rear coil form step 22-4, and the winding of the coil on that step resumes at higher speed with the traversing throw f as above-described.

Movement of block 68 to its rearmost position so as to locate flyer 46 in winding relationship with the smallest coil form step 22-4 closes limit switch LS2 thereby energizing control relay CR1 to provide an indication that the last coil of the set is being wound. Energization of control relay CR1 opens its contacts CR1-3 in series with the forward and reversing stepping commutators 134, 136, thus disabling the stepping reed relay RR2, and closes contacts CR1-2 in series with the forward and reverse stopping commutators 138, 140 thereby to permit energization of the stopping reed relay RR1 upon appearance of the turn completion signal across counter terminal 146 signifying completion of the desired number of turns of the last coil being wound on coil form step 22–4. As in the case of the previously wound coils, appearance of the early warning signal across early warning terminals 148 of counter 142 energizes relay CL1 thereby to energize the main drive motor 62 for low speed operation thereby rotating flyer 46 at low speed for the remaining turns of the winding on coil form step 22–4.

It will at this point be observed that reed relays are employed for the stepping and stopping relays RR2 and RR1, reed relays being extremely fast-acting and thus further contributing to the nearly instantaneous stepping and stopping action of the system. It will be readily understood that solid state switching devices may be employed rather than reed relays.

Energization of the last coil control relay CR1 closes its contacts CR1–3. Upon occurrence of the turn completion signal across counter terminals 146 signifying winding of the desired number of turns of the coil on the last coil form step 22–4, and upon completion of the circuit by the forward stopping commutator 138, the operating coil of reed relay RR1 is energized through the now closed control relay contacts CR1–2, the normally closed control relay contacts CR10–4, and the normally closed relay contacts RR2–2. Energization of the stopping reed relay RR1 opens its contacts RR1–1 thereby deenergizing control relay CR to open its contacts CR1 to deenergize the clutch coil 204, and closes its contacts CR2 to energize the brake coil 202. Energization of the stopping reed relay RR1 also closes its contacts RR1–4 thereby energizing time delay relay TR2 through the now closed CR1–3. Energization of time delay relay TR2 immediately closes its contacts TR2–2 to provide a sealing circuit through normally closed control relay contacts CR5–4. Energization of time delay relay TR2 opens its contacts TR2–1 thereby to deenergize the brake coil 202 after a short time delay and closes its time delay contacts TR2–D2, likewise after a short time delay, to energize solenoid E so as to extend the centering cylinder 158. Upon extension of piston rod 156 of centering cylinder 158 resulting in centering of disc 150 and flyer 46, as above described, limit switch LS3 is closed energizing solenoid F. Energization of solenoid F reverses the air connections to cylinder 78 to extend its piston rod 80 forwardly thereby to move block 68 to the extreme forward position and to return flyer 46 to its position in winding relationship with the forward coil form step 22–1, as shown by the arrow *i* in FIG. 3A, and as further shown in FIGS. 3G and I. Return of block 68 to its forward position closes limit switch LS4 thereby energizing latching relay CR5 to its latched position signifying completion of one cycle of operation, i.e. the winding of one set of coils in one direction upon coil form 20–1.

It is now assumed that a set of coils has previously been wound upon the coil form 20–2 located at the unloading station during winding of the set of coils, as above-described, on the coil form 20–1 at the winding station. Thus, the operator, may remove the coils from the coil forms at the unloading station while the next set is being wound on the coil form at the winding station. In order to remove the completed set of coils from the coil form 20 at the unloading station, the operator actuates switch 234, which is preferably a foot-actuated switch, thereby energizing solenoid G to extend coil form collapsing cylinder 42 thereby collapsing the coil form 20–2 at the unloading station by moving its lower part 36 upwardly toward its upper part 34 against spring 38. Collapse of the coil form at the unloading station moves limit switch LS5 to its "collapsed" position thereby energizing control relay CR6 through normally closed contacts CR7–1, energization of control relay CR6 closing its contacts CR6–1 to provide a sealing circuit. When the operator has completed removal of the coil from the collapsed coil form 20–2 at the unloading station, switch 234 is released thus deenergizing solenoid G to retract the form collapsing cylinder 42 and permitting the lower coil form part 36 to return to its expanded position under the influence of spring 38. Return of the coil form collapsing cylinder 42 to its retracted position returns limit switch LS5 to its "retracted" position thus energizing and latching relay CR7 through the now-closed control relay contacts CR6–2.

Assuming that the tape ejection cylinder 182 is extended, thus extending rack 180 so that limit switch LS6 is closed, with the control relay contacts CR7–2 now closed in response to collapse and subsequent expansion of the respective coil form indicating removal of the coils therefrom, when latching relay contacts CR5–5 close, as above-described, signifying completion of the cycle, the operating coil MI for index drive motor 32 is energized through the normally closed control relay contacts CR11–1 and CR8–1, thus energizing the index motor 32 to index or rotate the coil forms to move coil form 20–1 upon which a complete set of coils has been wound to the unloading station and to move coil form 20–2 from which the set of coils has just been removed to the tape-applying station. Rotation of index cam 44 immediately opens limit switch contacts LS7–1 which close when the coil forms have been indexed by 90° and again properly positioned at their respective stations, closing of limit switch contacts LS7–1 energizing control relay CR8 closing its sealing contacts CR8–2 and opening its contacts CR8–1 to deenergize the index motor contacts MI. Thus, it is seen, that the coil forms 20 cannot be indexed until the coil form at the unloading station has been collapsed and extended, signifying removal of the set of coils therefrom.

Rotation of index cam 44 to a position indicating proper locating of the coil forms also closes limit switch contact LS7–2 energizing time delay relay TR4 through the now-closed control relay contacts CR8–3. Energization of time delay relay TR4 closes its contacts CR4–1 to unlatch control relay CR5 and also closes its contacts CR4–2 to unlatch control relay CR7. Unlatching of control relay CR5 and CR7 open their contacts CR5–5 and CR7–2 thereby deenergizing control relay CR8 opening its contacts CR8–3 to deenergize time delay relay TR4. Deenergization of time delay relay TR4 immediately closes its contacts TR4–3 to energize the automatic restarting control relay CR9, time delay contacts TR4–D opening after a predetermined time delay to deenergize control relay CR9. Energization of control relay CR9 closes its contacts CR9–1 in parallel with the START-2 switch contacts, thus commencing a new cycle of operation, as above-described.

Indexing of the coil form assembly 14 by 90° rotates cam 160 by that amount closing limit switch LS8 to energize control relay CR10. Energization of control relay CR10 opens its contacts CR10–1 and closes its contacts CR10–2 to deenergize the forward motor contacts MF and energize the reverse motor contacts MR. Energization of control relay CR10 also closes its contacts CR10–3 and CR10–5, and opens its contacts CR10–4 and CR10–6 to render the reverse stopping and stepping commutators 140 and 136 effective, and to disable the forward stopping and stepping commutators 138 and 134.

It will be observed that a manually actuated indexing switch 236 is provided for energizing the index contacts MI as desired.

In the particular illustrated embodiment, it is desired that the tape ejection mechanism 16 be actuated upon completion of the winding of three of the four coils being wound at the winding station, provided the operator has already removed the previously wound coils from the coil form at the unloading station, as signified by collapse and subsequent expansion of the coil form, or alternatively during removal of the coils from the coil form at the unloading station if that operation has not been accomplished during winding of the new set of coils. Further, it is necessary to terminate the application of vacuum to the channels 164 and slots 162 in order to permit application of a new length of tape to the coil form 20–3 at the tape applying station, however, it is desired that vacuum be applied to all of the coil forms, other than the coil form 20–2 at the unloading station, at least until three of the four coils have been wound on the coil form 20–1 at the winding station. Energization of solenoid I actuates the vacuum valve to apply vacuum to the channels 164 and slots 162 and thus, control relay 12 and solenoid I are normally energized through the normally closed control relay contacts CR1-5 and the sealing contacts CR12-2, energization of control relay CR12 opening its contacts CR12-1 in series with solenoid H which when energized retracts the tape ejection cylinder 182.

Thus, assuming the situation where the coils have already been removed by the operator from the coil form 20-2 at the unloading station prior to completion of the winding of the set of coils on the coil form 20-1 at the winding station, control relay contact CR7-3 will be closed in response to collapse and subsequent expansion of the coil form 20-2. Movement of block 68 to its rearmost position thus opening limit switch LS2 energizes control relay CR1 closing its contacts CR1-4 and opening its contacts CR1-5 thereby deenergizing control relay 12 and solenoid I to terminate the application of the vacuum, contacts CR12-1 in series with solenoid H closing. Limit switch LS9 is normally open, being closed when the tape ejection cylinder 182 and rack 180 are retracted. Thus, appearance of the early warning signal for the last coil which causes energization of time delay relay TR1, as above described, closes contacts TR1-3 thereby to energize control relay 11 and solenoid H to retract tape ejection cylinder 182 and rack 180, thereby ejecting a length of tape from source 170 into the slot 162 of the coil form 20-3 at the tape applying station. Energization of control relay CR11 closes its sealing contacts CR11-1. Retraction of the tape ejection cylinder 182 to the rearmost position of rack 180 closes limit switch LS9 again to energize control relay CR12 and solenoid I, thereby again applying vacuum to retain the newly applied tape, energization of control relay CR12 opening its contacts CR12-1 to deenergize solenoid H thus to extend tape ejection cylinder 182 and rack 180. Extension of tape ejection cylinder 182 and rack 180 again opens limit switch LS9, however it being recalled that the tape ejection process started no earlier than the early warning signal for the last coil which precedes the turn completion signal for the last by only a few revolutions of the flyer 46, by the time the tape cylinder 182 is extended to open limit switch LS9, block 68 has been returned to its forward position thus opening limit switch LS2 and deenergizing control relay CR1 thereby closing contacts CR1-5 so that control relay 12 is now sealed-in through its own contact CR12-2.

In the alternative situation, i.e. in which the coils have not been removed from the coil form 20-2 at the unloading station prior to the completion of winding of the set of coils on the coil form 20-1 at the winding station, latching relay contacts CR5-6 will close upon completion of the cycle, as above-described, and upon actuation of the coil form collapse switch 234 with the result of closing of control relay contacts CR6-3, CR11 and solenoid H will again be energized, as above described. A manually actuated switch 236 is provided for manual ejection of tape when desired.

Extension of the tape ejection cylinder 182 and rack 180 closes limit switch LS6, and deenergization of control relay CR11 responsive to unlatching of control relay CR7 together with deenergization of control relay CR6, thus opening their contacts CR7-3 and CR6-3, results in closing of control relay contacts CR11-1 thus permitting the next energization of index motor contact MI.

Inspection of FIG. 3G, H and I will now indicate that vacuum is applied to all of the coil forms, with the exception of the coil form at the unloading station, until appearance of the last coil signal responsive to movement of the block 68 to its rearmost position. Upon appearance of the early warning signal, and provided that the coils have already been removed from the coil form at the unloading station, tape ejection mechanism 16 is actuated to apply tape to the coil form at the tape applying station. Upon appearance of the turn completion signal for the last coil being wound at the winding station, the clutch is deenergized and the brake is energized, the centering cylinder 158 is extended, the block 68 and flyer 46 are returned to the forward position and upon return, vacuum is again applied in response to extension of the tape ejection cylinder 182. With a complete set of coils thus wound on the coil form 20-1 at the winding station, the coils removed from the coil form 20-2 at the unloading station, and a new length of tape applied to coil form 20-3 at the tape applying station, the coil forms are indexed by 90° the motor is again energized at high speed in the reverse direction, and a new cycle is automatically started to wind a new set of coils on the coil form now located at the winding station.

The tape applying mechanism 16 diagrammatically illustrated in FIG. 1 is further illustrated and described in application Ser. No. 842,567, filed July 17, 1969 of the present inventor, likewise assigned to the Assignee of the present application.

Referring now to FIG. 4, another embodiment is shown, with like elements being indicated by like reference numerals, in which slide 72' rather than being oscillated with throws corresponding to the length of the respective coil form steps 22 thereby to level-wind the coils on the respective coil form steps, is continuously traversed from an extreme forward position, as shown in FIG. 4, to a rearward position as shown by the dashed line 240, by a lead screw 242, thereby to traverse the flyer 46 (not shown in FIG. 4) from the forward end of the largest coil form step 22-1' to the rear end of the smallest coil form step 22-4', so as to single layer-wind the coils upon the coil form steps. Thus, in this embodiment, the level-wind mechanism 102 of the embodiment of FIG. 1 is eliminated in its entirety. Further, for simplicity, the tape ejection mechanism 16 of the embodiment of FIG. 1 is not shown, it being understood that the tape ejection mechanism may not necessarily be included with either embodiment.

Referring additionally to FIG. 6A, in this embodiment, with block 68' in its forward position actuating limit switch LS4, and with slide 72' in its forward position actuating limit switch LS12, flyer 46 will be positioned in winding relationship adjacent the forward end of the first coil form step 22-1', as shown by the dashed line 244. A half-nut 246 is pivotally mounted on bracket 248 attached to slide 72' for selectively engaging and disengaging lead screw 242. Half-nut 246 is actuated to its disengaged position by pneumatic cylinder 250 actuated by a solenoid valve, identified as solenoid K. A limit switch, identified as LS11, senses engagement and disengagement of half-nut 246 with the screw 242. Half-nut 246 is returned to its engaged position upon deenergization of solenoid K and deactuation of cylinder 250 by a suitable spring 252.

Lead screw 242 is driven in one direction so as to move slide 72' together with block 68', splined shaft 48 and flyer 46 rearwardly in the direction shown by the arrow 254, when half-nut 246 is engaged with lead screw 242, by a conventional one way drive mechanism 256, in turn driven by a variable speed drive mechanism 258 from drive shaft 60. Thus, with block 68' and slide 72' respectively in their forward positions, thus locating flyer 46 at its initial position 244 in winding relationship with the forward end of the largest coil form step 22-1', and with half-nut 246 engaging lead screw 242, energization of the clutch portion of clutch-brake 64 will cause rotation of the flyer at high speed and movement of slide 72' in the direction shown by the arrow 254 by lead screw 242.

Winding thus proceeds at high speed in one direction until appearance of the early warning signal, as above-described, a predetermined number of turns advance of completion of the winding of the coils on the first coil form step 22-1'. Upon occurrence of the early warning signal, the main drive motor 62 is actuated to low speed and upon occurrence of the turn completion signal, and with the flyer 46 properly rotationally positioned with respect to the coil form 20-1, the right latch 82 is actuated so that block 68', splined shaft 48 and flyer 46 are moved rearwardly by cylinder 78 until latch 84 engages abutment 88', thus moving flyer 46 by one incremental step, as shown by the arrow b from its final position adjacent end 210' of the first coil form step 22', as shown by the dashed line 260, to an initial position adjacent the forward end of the next coil form step 22', as shown by the dashed line 262. It will be readily seen that the location of the finishing end of the first coil wound on step 22–1' may be determined by adjustment of the helix of the coil, in turn determined by adjustment of the variable speed drive 258, and that the dimension of the incremental step movement $b$ is determined by the axial spacing of the abutments 86' and 88' on block 68'. As in the case of the previous embodiment, upon actuation of the respective latch and rearward movement of the block and flyer by the corresponding one incremental step, the main drive motor 62 is again energized for high speed operation to commence winding the next coil on step 22–2' at high speed.

The winding of the coils on the four progressively smaller coil form steps thus proceeds with slide 72' being continuously traversed by operation of lead screw 242 in direction 254 until occurrence of the turn completion signal indicating completion of the last coil on the smallest coil form step 22–4', the flyer 46 again being properly located rotationally with respect to coil form 20–1, as above described. At this point, the clutch is deenergized and the brake energized, the centering cylinder 158 is extended, both latches 82, 84 are retracted, and the block 68' is moved to its extreme rear position thereby actuating the limit switch identified as LS10; this additional rearward movement of block 68' in this embodiment is provided in order to permit indexing of the forms without striking the flyer. Upon actuation of limit switch LS10, solenoid K is energized to actuate cylinder 250 to disengage the half-nut 246 from lead screw 242 and solenoid M is energized to actuate pneumatic cylinder 264 to extend its piston rod 266 to return slide 72 to its forward position, indexing of the forms 20 taking place during the return of the slide.

It should be observed that while the coil form steps 22–1' and 22–2', 22–3' and 22–4' are shown in FIGS. 4 and 6 as being of equal axial length, they may be of different lengths as required by the number of turns to be wound on the respective coils.

As pointed out in greater detail in the aforesaid application Ser. No. 813,798 of the present inventor in which the apparatus of FIGS. 1 and 4 is disclosed in greater detail, it is necessary for proper operation of the apparatus that the half-nut 246 be completely reengaged with lead screw 242 upon return of slide 72' to its initial position, thereby to actuate limit switch LS11 so as to initiate a new winding operation; as will be hereinafter seen, it is possible for half-nut 246 partially to engage the threads of lead screw 242 without actuating limit switch LS11 to its engaged position. It is thus desired that lead screw 242 have a predetermined rotational position with respect to half-nut 246 prior to deactuation of cylinder 250 so as to reengage half-nut 246 with the lead screw. In order to accomplish this orientation of lead screw 242 with respect to half-nut 246, a commutator 268 is driven by lead screw 242, commutator 268 having cooperative contacts which complete a circuit therewith when lead screw 242 is properly orientated with respect to half-nut 246. As will be hereinafter described, during return of the slide 72' to its forward position by extension of slide return cylinder 264, and during indexing of the coil forms 20, if a circuit is not completed through commutator 268, thus indicating that lead screw 242 is not properly oriented, solenoid L is energized thus extending lead screw orienting cylinder 270 and rack 272, rotating a gear 274 coupled to lead screw 242 by another one-way drive mechanism 276. When lead lead screw 242 moves into the proper rotational position with respect to half-nut 246, commutator 268 completes a circuit through its cooperative contacts which deenergizes solenoid L and retracts orienting cylinder 270. With the lead screw 242 properly oriented with respect to the half-nut 246, solenoid K is deenergized thus deactuating cylinder 250 to permit reengagement of half-nut 246 with lead screw 242, limit switch LS11 is actuated, block 68' is returned to its forward position by extension of cylinder 78 thus closing limit switch LS4, and the automatic winding of the next set of coils then proceeds.

Figure 5C:
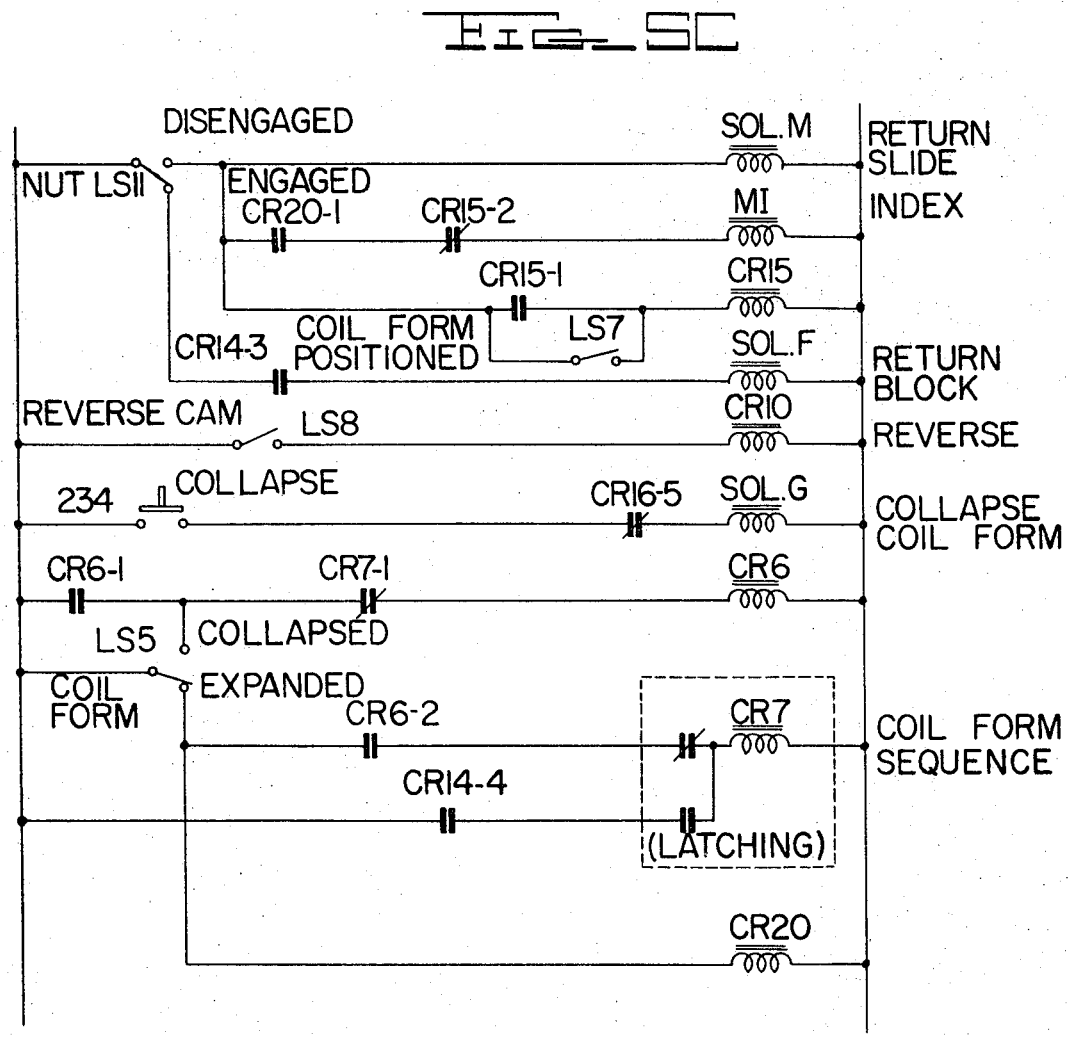
FIG. 5 is a circuit diagram schematically illustrating the automatic control system for the apparatus of FIG. 4.

Referring now additionally to FIG. 5 illustrating the control circuit for the embodiment of FIG. 4, and in which like elements are again indicated by like reference numerals, it is again assumed that slide 72' is in its extreme forward position, thus closing limit switch LS12, and that the block 68' is likewise in its extreme forward position, thus closing limit switch LS4, flyer 46 thus being located adjacent the forward end of the largest coil form step 22–1', as shown by the dashed line 244 in FIG. 6A. Thus, actuation of the START switch 204 closing the START–1 contacts will energize the high speed contacts MH through the normally closed time delay relay contacts TR1–1, the forward contacts MF through normally closed control relay contacts CR10–1, and control relay CR2, which thus closes its contacts CR2–1 to seal-in across the START–1 switch contacts. With limit switches LS12 and LS4 closed, momentary closing of the START–2 switch contacts will energize solenoid A so as to retract the centering cylinder 158 (FIG. 1). Retraction of the centering cylinder 158 closes limit switch LS1 thereby energizing time delay relay TR3 which results in energization of the clutch solenoid 204 and deenergization of the brake solenoid 202, as above-described. The flyer 46 is thus rotated at high speed in the forward direction and rotation of lead screw 242 traverses slide 72' and flyer 46 in direction 254, and is shown by the arrow $a$ in FIG. 6A, thereby to wind the first coil of the first coil form step 22–1'.

Upon appearance of the early warning signal across terminals 148 of counter 142, relay CL1 is energized thus closing its contacts CL1–2 and energizing time delay relay TR1, in turn opening its contacts TR1–1 and closing its contacts TR1–2 to energize the main drive motor 62 for low speed operation. Upon appearance of the turn completion signal across terminals 146 of counter 142, and when the forward stepping commutator 134 completes a circuit as above described, reed relay RR2 (FIG. 2) is energized closing its contacts RR2–4 to energize solenoid C which, in turn, actuates cylinder 87 to retract the right latch 82. Cylinder 78 thus moves block 68' rearwardly by one incremental step until latch 84 engages abutment 88' thereby moving flyer 46 rearwardly, as shown by the arrow $b$ in FIG. 6A, to the position as shown by the dashed line 262 in which it is in winding relationship adjacent the forward end of the second coil form step 22–2'. As in the case of the embodiment of FIG. 1, energization of the stepping reed relay RR2 opens its contacts RR2–1 thus deenergizing relay CL1, opening of the contacts CL1–2 thus deenergizing time delay relay TR1 to open its contacts TR1–2 and closing its contacts TR1–1 again to energize drive motor 62 for high speed operation.

As in the case of the embodiment of FIG. 1, the first closing of the reed relay RR2 closing its contacts RR2–5 causes latching of latching relay CR3, deenergization of stepping reed relay RR2 then closing its contacts RR2–6 to latch latching relay CR4 (FIG. 2) thereby opening contacts CR4–1 and closing contacts CR4–2 so that solenoid D is energized in response to the second early warning signal a predetermined number of turns in advance of completion of the coil on the second step 22–2', thereby to energize solenoid D and to retract the left latch 84.

The winding and stepping operation now continues until the next actuation of the right latch 82 to release abutment 90' and to permit block 68 to be moved rearwardly until the left latch 84 engages abutment 92', this being the last winding position of block 68' resulting in closing of limit switch LS2; however, as pointed out hereinafter, block 68 is later moved still further rearwardly. Closing of limit switch LS2 energizes control relay CR1 which disables the stepping commutator 134, 136, and enables the stopping commutators 138, 140, as above-described.

Upon appearance of the turn completion signal across turn completion terminals 146 of counter 142 indicating completion of the winding of the last coil on the smallest coil form step 22–4', and upon completion of the circuit by the forward stopping commutator 138 thereby energizing reed relay RR1, its contacts RR1–4 close and energize time delay relay TR2 through the now-closed control relay contact CR1–3. Energization of time delay TR2 closes its contacts TR2–2 to seal-in its operating coil through the limit switch LS3 in its retracted position. Time delay relay contacts TR2-D2 close after a predetermined time delay to energize solenoid E to extend the centering cylinder 158.

Extension of the centering cylinder 158 closes limit switch LS3. Assuming now that the coil form at the unloading station has been collapsed and extended, as above-described, thereby latching control relay CR7 (FIG. 2) contacts CR7-4 will be closed thereby energizing control relay 16 through the normally closed relay contacts CR14-2 and the normally closed time delay relay contacts TR5-2. Energization of control relay CR16 closes its contacts CR16-1 and CR16-2 thereby energizing both solenoids C and D to actuate both cylinders 87 and 89, thereby retracting both the right latch 82 and the left latch 84, so that cylinder 78 moves block 68' still further rearwardly to its rearmost position at which point limit switch LS10 is actuated. Energization of control relay CR16 also closes its contacts CR16-3 to unlatch control relay CR3.

Movement of block 68' to its rearmost position closing limit switch LS10 energizes control relay CR17. Energization of control relay CR17 closes its contacts CR17-1 thus energizing solenoid K through the now closed control relay contacts CR16-4. Energization of solenoid K actuates cylinder 250 to extend its piston rod to pivot half-nut 246 so as to disengage lead screw 242. It will be further remembered that actuation of the stopping reed relay RR1 opened its contacts RR1-1 to deenergize the clutch solenoid 204 and energize the brake solenoid 202 (FIG. 2).

Actuation of the half-nut 246 to its disengaged position actuates limit switch LS11 to its disengaged position, thus energizing solenoid M which actuates the slide return cylinder 264 to extend its piston rod 266 to return slide 72' to its forward position. Assuming now that lead screw 242 is not properly oriented with the half-nut 246 for proper reengagement of the nut therewith, and that the lead screw orienting commutator 268 thus does not complete a circuit with its cooperating contacts, with control relay contacts CR17-1 and CR16-4 closed, as above described, control relay CR18 will not be energized, control relay CR19 will be energized through the normally closed contacts CR18-2, and will be sealed-in through its contacts CR19-1. Solenoid L is also energized through normally closed control relay contacts CR18-1 thereby extending the lead screw orientating cylinder 270 and rack 272 to rotate gear 274 and lead screw 242. When the lead screw 242 is properly oriented with respect to the half-nut 246, lead screw orienting commutator 268 will complete the circuit with control relay CR18 thus energizing the same resulting in the opening of its contacts CR18- 1 and CR18-2 to deenergize solenoid L and control relay 19, thus terminating the orienting rotation of lead screw 242 which, it will be observed, is performed independently of the normal drive of lead screw 242 through drive shaft 60, variable speed drive 258 and one-way drive 256.

Assuming now that the coil form at the unloading station has been collapsed and subsequently expanded, as above described, limit switch LS5 will be in its expanded position thus energizing control relay CR20 closing its contacts CR20-1. With the half-nut 246 in its disengaged position, thus actuating limit switch LS11 to its disengaged position, as above-described, the index drive motor contacts MI are energized through the now-closed control relay contacts CR20-1 and the normally closed control relay contacts CR15-2. Upon indexing of the coil forms by the proper rotational amount and with the coil forms again properly located, limit switch LS7 closes thereby energizing control relay CR15 closing its sealing contact CR15-3 and opening its contacts 15-2 to deenergize the index drive motor contacts MI, thereby deenergizing the index drive motor 32.

When the slide 72' is returned to its forward position thus closing limit switch LS12, control relay CR14 is energized through the now-closed control relay contacts CR15-1, energization of control relay CR14 closing its contacts CR14-1 to provide a sealing circuit to the normally closed time delay relay contacts TR5-2. Energization of control relay CR14 opens its contacts CR14-2 thereby deenergizing control relay 16 which, in turn, opens its contacts CR16-4 to deenergize solenoid K thus deactuating cylinder 250 to permit spring 252 to return the half-nut 246 to its engaged relationship with lead screw 242. Reengagement of the half-nut 246 with the lead screw 242 actuates limit switch LS11 to its engaged position and with control relay CR14 now energized closing its contacts CR14-3, solenoid F is energized thereby reversing the application of air to cylinder 78 and returning block 68' to its forward position. Return of block 68' to its forward position closes limit switch LS4 which energizes time delay relay TR5. Energization of time delay relay TR5 closes its contacts TR5-1 and energizes the centering cylinder retraction solenoid A through the still closed time delay contacts TR5-D. Energization of time delay relay TR5 immediately opens its contacts TR5-2 thus deenergizing control relay CR14. Meanwhile, indexing of the coil forms has rotated reversing cam 160 (FIG. 1) thereby closing limit switch LS8 to energize the reverse control relay CR10, as above described in connection with FIG. 2. Thus, a new cycle of operation is initiated with flyer 46 returned to its forward location and with the motor 62 operated at high speed in the reverse direction.

Referring again briefly to FIG. 6, it will be seen that upon completion of the last coil wound on the smallest coil form step 22-4', the clutch is deenergized and the brake energized, the centering cylinder 158 is extended, both latches 82, and 84 are retracted to permit block 68' to be moved to its extreme rearward position thereby to actuate limit switch LS10, the lead screw nut 246 is released thus actuating limit switch LS11, and the slide 72' is returned to its forward position, the orienting cylinder 270 being extended to the extent required properly to orient lead screw 242 with the lead screw nut 246. Then, provided the coil form at the unloading station has been collapsed and extended, thus signifying the removal of the coils therefrom, the coil forms are indexed, the lead screw nut 246 is reengaged, and the block 68' is returned to its forward position thus closing limit switch LS4 and initiating a new cycle of operation with the flyer winding a new set of coils on the coil form at the winding station in the reverse direction.

It will now be seen that the high speed operation of both embodiments of the invention is attributable to a number of features. Rapid initial acceleration of the flyer is provided due to the fact that the main drive motor is already running at high speed and the flyer is clutched into it. Rapid deceleration from the high to the low speed is provided by the employment of an induction motor which provides high slowdown torque. It will be understood that in order to move the flyer rearwardly by the requisite incremental step and to stop the flyer accurately, it is necessary that the flyer be rotating at a constant speed. Further, with winding performed at a high speed, such as on the order of 3000 r.p.m., stepping is more accurately performed at a slower speed. It has been found that the flyer can be accurately stepped at speeds as high as 1500 r.p.m., the employment of a constant torque motor providing the requisite constant speed. Thus, by merely slowing the flyer rather than bringing it to a complete stop as in the case of prior winders, a very appreciable saving in time is effected.

It will further be seen that in order to accurately step the flyer so that the intercoil connections are always positioned at the same desired location, it is necessary that the interval of time between completion of the circuit by the respective stepping commutator until releasing of the respective latch be constant. Alternating current-energized relays and solenoids do not provide the requisite constant time interval since they have an inherent one-quarter cycle variation in their pickup time. For this reason, reed relays are employed for the stepping and stopping functions which have a very fast and constant operating time, the reed relays being energized from a highly filtered source of direct current which is substantially ripple-free. Finally, it has been found that variation in the operating time of pneumatic cylinders and solenoid valves is encountered due to the presence of oil and moisture in the high pressure air supplied thereto and thus, in order to insure that the stepping latches are actuated at the same time interval following the circuit completion by the stepping commutators, oil and moisture is filtered from the air supply, thus providing substantially dry air to the latch-actuating cylinders.

It has been found that the high speed coil winding apparatus of the invention permits a substantial increase in the production rate over prior coil winders in which the flyer was brought to a complete stop between each coil; in some instances, the production rate has been doubled.

While there have been described above the principles of this invention in connection with specific apparatus, it is to be clearly understood that this description is made only by way of example and not as a limitation to the scope of the invention.

I claim:

1. Apparatus for automatically winding a set of at least two concentric dynamoelectric machine coils comprising: a coil form having spaced opposite ends with at least two progressively smaller steps extending therebetween: a flyer mounted on a shaft for winding a wire on said coil form steps to form said coils; first means for rotatably supporting said shaft; an electric motor providing at least two speeds coupled to said shaft for rotating the same and said flyer; a control circuit including first control means for selectively energizing said motor for high and low speed operation; second means for supporting said first support means for longitudinal movement parallel with the axis of said shaft; first means on said second support means and operatively connected to said first support means for selectively sequentially moving said first support means, shaft and flyer from a forward to a rear position in at least one incremental step thereby respectively to position said flyer in winding relationship with said coil form steps; second means operatively coupling said motor to said second support means for moving the same and said first support means, shaft and flyer longitudinally parallel with the axis of said shaft thereby to traverse said flyer with respect to said coil form; means for selectively positioning said first support means, shaft and flyer at an initial location with said first support means in said forward position and with said flyer in winding relationship with a first coil form step adjacent one end of said coil form; means for counting the number of revolutions of said shaft and flyer; means for initially actuating said first control means to energize said motor for high speed operation thereby to wind a first coil on said first coil step at high speed; said control circuit further including second control means responsive to said counting means for actuating said first control means to energize said motor for low speed operation in response to winding a first predetermined number of turns of said first coil, and third control means responsive to said counting means for actuating said first moving means to move said first support means, shaft and flyer by a first said incremental step from said forward position to a second position with said flyer located in winding relationship with a second coil form step adjacent said first coil form step in response to a second coil form step adjacent said first coil form step in response to a second predetermined number of turns of said first coil greater than said first number corresponding to completion of said first coil; said third control means being coupled to said first control means and actuating the same to energize said motor for high speed operation in response to said second number thereby to initiate winding of a second coil on said second coil form step at high speed.

2. The apparatus of claim 1 wherein said motor is a multiphase, alternating current induction motor thereby providing rapid deceleration from said high to said low speed, said motor providing substantially constant speed operation of said flyer at said low speed.

3. The apparatus of claim 2 wherein said motor is of the constant torque type.

4. The apparatus of claim 1 wherein said first moving means includes means for normally biasing said first support means toward said rear position, selectively actuable latching means for retaining said first support means at said forward position and at least at said second position, and means including electromagnetic means for actuating said latching means thereby permitting said biasing means to move said first support means rearwardly by one said incremental step to the next position, said third control means including a source of electric current and means for selectively energizing said electromagnetic means thereby.

5. The apparatus of claim 4 wherein said electromagnetic means includes at least one reed relay, and wherein said source provides substantially ripple-free direct current for energizing said reed relay.

6. The apparatus of claim 5 wherein said actuating means includes a pneumatic cylinder operatively connected to said latching means and having an air line for supplying a actuating air thereto, said electromagnetic means further including a solenoid valve in said air line, said valve being energized from a source of direct current, and further comprising means for filtering the air supplied to said solenoid valve and cylinder to remove oil and moisture therefrom.

7. The apparatus of claim 4 wherein said control circuit includes fourth control means operatively driven by said motor in synchronism with said shaft and flyer for sensing a predetermined rotational position of said flyer with respect to said coil form, said third control means including means responsive to said fourth control for energizing said electromagnetic means whereby said first support means, shaft and flyer are moved to said second position in response to said second number only when said flyer is in said predetermined rotational position.

8. The apparatus of claim 7 wherein said fourth control means includes a commutator and cooperative contacts which complete a circuit for energizing said electromagnetic means when said flyer is in said predetermined rotational position.

9. The apparatus of claim 1 wherein said control circuit includes clutch means for selectively starting and stopping said shaft and flyer, fourth control means responsive to said counting means for actuating said clutch means to stop said shaft in response to winding a predetermined number of turns of the last coil of said set on the coil form step adjacent the other end of said coil form, said fourth control means actuating said positioning means to return said first support means, shaft and flyer to said initial location, and fifth control means for actuating said clutch means and first control means to start said shaft and to energize said motor at high speed in response to return of said first support means to said initial location thereby to initiate winding of a new set of coils on said coil form.

10. The apparatus of claim 9 wherein said control circuit includes sixth control means operatively driven by said motor in synchronism with said shaft and flyer for sensing a predetermined rotational position of said flyer with respect to said coil form, said fourth control means including means responsive to said sixth control means for actuating said clutch means to stop said shaft in response to said last-named number only when said flyer is in said predetermined rotational position.

11. The apparatus of claim 10 wherein said sixth control means includes a commutator and cooperative contacts which complete a circuit for actuating said clutch means when said flyer is in said predetermined rotational position.

12. The apparatus of claim 9 wherein said motor is reversible, said control circuit including sixth control means for selectively reversing the direction of rotation of said motor, said initial actuating means actuating said sixth control means for operation of said motor in one direction, said fifth control means actuating said sixth control means to reverse said motor whereby said new set of coils is wound in the opposite direction.

13. The apparatus of claim 9 further comprising at least a second coil form identical to said first-named coil form and radially spaced therefrom, means for selectively indexing said coil forms between at least winding and unloading stations, each of said coil forms being collapsible to permit removal of the set of coils wound thereon, means at said unloading station for selectively actuating the respective coil forms between collapsed and expanded position; said control circuit including sixth control means for actuating said indexing means thereby to move one of coil forms to said unloading station and another coil form to said winding station in response to one of said fourth and fifth control means, and seventh control means including means for inhibiting actuation of said indexing means when said coil form at said unloading station is in its collapsed position and means for inhibiting said first control means when said coil forms are removed from said winding and unloading stations, respectively.

14. The apparatus of claim 13 wherein each of said coil forms includes means for receiving a length of adhesive tape for retaining the turns of the coils of a set, each of said coil forms having a vacuum conduit communicating with said receiving means, and further comprising a supply of adhesive tape, means at a station other than said winding station for selectively withdrawing a predetermined length of tape from said supply and positioning the same in said receiving means of the respective coil form, a vacuum line for applying a vacuum to said conduits thereby to retain the length of tape in the respective receiving means, means for inhibiting application of vacuum to the coil form at said unloading station, and valve means in said vacuum line for selectively opening and closing the same; said control circuit including eighth control means including means for actuating said valve means to close said vacuum line and for actuating said withdrawing means to position a length of tape in the receiving means of the respective coil form, means for inhibiting actuation of said valve and withdrawing means prior to winding at least a part of the coils of the set being wound at the coil form at said winding station, means for actuating said valve means to open said vacuum line in response to positioning a length of tape in the respective receiving means, and means for inhibiting actuation of said winding means prior to withdrawal and positioning of said length of tape in the respective receiving means.

15. The apparatus of claim 9 further comprising means for selectively rotationally positioning said shaft and flyer to have a predetermined rotational relationship with said coil form; one of forth and fifth control means actuating said last-named positioning means.

16. The apparatus of claim 1 wherein said motor is multiphase, constant torque, alternating current induction motor thereby providing rapid deceleration from said high to said low speed; said first moving means including means for normally biasing said first support means toward said rear position, selectively actuable latching means for retaining said first support means at said forward position and at least at a second position spaced from said first position by said first incremental step, and means including a reed relay for actuating said latching means thereby permitting said biasing means to move said first support means rearwardly by one said incremental step to the next position; and further comprising a source of substantially ripple free direct current; said control circuit including fourth control means operatively driven by said shaft in synchronism with said shaft and flyer for sensing a predetermined stepping rotational position of said flyer with respect to said coil form, said third control means including means responsive to both said counting means and to said fourth control means for energizing said reed relay from said source whereby said first support means, shaft and flyer are moved to said second position in response to said second number only when said flyer is in said predetermined stepping rotational position; said control circuit including clutch means for selectively starting and stopping said shaft and flyer, said clutch means including a second reed relay for actuating the same, fifth control means operatively driven by said motor in synchronism with said shaft and flyer for sensing a predetermined stopping rotational position of said flyer for sensing a predetermined stopping rotational position of said flyer with respect to said coil form, sixth control means responsive to both said counting means and to said fifth control means for energizing said second reed relay from said source thereby to actuate said clutch means to stop said shaft in response to winding a predetermined number of turns of the last coil of said set on the coil form step adjacent the other end of the coil form when said flyer is in said predetermined stopping rotational position; said sixth control means actuating said positioning means to return said first support means, shaft and flyer to said initial location, and seventh control means for actuating said fourth and first control means to start said shaft and to energize said motor at high speed in response to return of said first support means to said initial location thereby to initiate winding of a new set of coils on said coil form.

17. The apparatus of claim 1 wherein said coil form includes at least one step having a first axial length and at least one other step having a second axial length, said second coupling means including means for oscillating said second support means and said first support means, shaft and flyer with first and second throws respectively generally corresponding to said first and second lengths thereby to level-wind coils on said steps, and means for selectively shifting said oscillating means between said first and second throws; said third control means including means for actuating said shifting means to shift said coupling means from said first to said second throws with movement of said first support means, shaft and flyer by a said incremental step from winding relationship with a coil form step having said first length to winding relationship with a coil form step having said second length.

18. The apparatus of claim 1 wherein said second support means is axially movable between forward and rear positions, said second support means being in said forward position when said first support means, shaft and flyer are at said initial location, said first support means, shaft and flyer are at said initial location shaft and flyer having a final location with said first and second support means respectively in said rear position thereof and with said flyer in winding relationship with a last coil form step adjacent the other end of said coil form; said second moving means including a lead screw, drive means for operatively connecting said lead screw to said motor, and means connected to said second support means for selectively engaging and disengaging said lead screw, said lead screw with said engaging means engaged therewith continuously moving said second support means from said forward to said rear position thereof, thereby moving said first support means, shaft and flyer to traverse said flyer from one end to the other end of said coil form; said control circuit including fourth control means responsive to said counting means for actuating said engaging means to disengage said lead screw in response to winding a predetermined number of turns of the last coil of said set on said last coil form step; said positioning means including third means for selectively moving said second support means and said first support means, shaft and flyer from said rear position to said forward position of said second support means, said first moving means being arranged selectively to move said first support means, shaft and flyer from said rear position to said forward position of said first support means, said fourth control means actuating said third moving means to return said second support means to said forward position; said control circuit including fifth control means for actuating said engaging means to reengage the same with said lead screw when at least said second support means is in said forward position, one of said fourth and fifth control means actuating said first moving means to return said first support means to said forward position.

19. The apparatus of claim 18 wherein said drive means include means for selectively connecting said lead screw to said motor, said fourth control means including means for actuating said connecting means to disconnect said lead screw from said motor thereby to stop said lead screw; said control circuit including sixth control means for sensing a predetermined rotational position of said lead screw with respect to said engaging means, and means for selectively rotating said lead screw independently of said drive means; said fourth control means actuating said rotating means to rotate said lead screw is in said position, said fifth control means actuating said engaging means to reengage said lead screw in response to said sixth control means whereby said lead screw is reengaged only when the same is in said position; said control circuit including seventh control means for actuating said drive means to reconnect said lead screw to said motor in response to reengagement of said engaging means with said lead screw and return of said first support means to said forward position thereby to initiate winding a new set of coils on said coil form.

20. The apparatus of claim 19 wherein said sensing means includes a commutator operatively driven by said lead screw and cooperating contacts which complete a circuit when said lead screw is in said predetermined rotational position thereby to actuate said engaging means to reengage sad lead screw.

UNITED STATES PATENT OFFICE
CERTIFICATE OF CORRECTION

Patent No. 3,578,034          Dated May 11, 1971

Inventor(s) Robert J. Eminger

It is certified that error appears in the above-identified patent and that said Letters Patent are hereby corrected as shown below:

SPECIFICATION

Abstract, line 3, "small" should be --smaller--.
Column 3, line 12, delete "14".
Column 4, line 16, change "MH" to --rearwardly--.
        lines 47-48, delete "in pivotal movement of latch 82 away from abutment 90 with the result--,
Column 5, line 9, after "different" insert --throws for the slide 72 respectively corresponding to the two different--.
Column 6, line 71, change "as" to --a--.
Column 7, line 23, change "contact" to --contacts--.
        line 70, change "contact" to --contacts--.
Column 9, line 17, change "retracting" to --retraction--.
Column 11, line 31, after "closed" insert --contacts--.
Column 12, line 31, change "CR4-1" to --TR4-1--.
Column 13, line 37, before "by" insert --coil--.
        line 60, "contact" should be --contacts--.
Column 15, line 62, delete "lead" (second occurence)

CLAIMS

Claim, Column 19, lines 55-56, delete "coil form step adjacent said first coil form step in response to a second".
Claim 6, Column 20, line 14 - before "actuating" delete --a--.
Claim 7, Column 20, line 26 - after "control" insert --means--.
Claim 13, Column 20, line 76- "position" should be --positions--.
Claim 16, Column 21, lines 67-68 - delete "for sensing a predetermined stepping rotational position of said flyer".

UNITED STATES PATENT OFFICE
CERTIFICATE OF CORRECTION

Patent No. 3,578,034          Dated May 11, 1971

Inventor(s) Robert J. Eminger        PAGE - 2

It is certified that error appears in the above-identified patent and that said Letters Patent are hereby corrected as shown below:

Claim 18, Column 22, lines 29-30 - delete "are at said initial location shaft and flyer".
Claim 19, Column 22, line 71 - after "screw" insert --to said predetermined rotational position; said sixth control means deactuating rotating means when said lead screw--.
Claim 20, Column 24, line 5 - "sad" should be --said--.

Signed and sealed this 18th day of January 1972.

(SEAL)
Attest:

EDWARD M. FLETCHER, JR.        ROBERT GOTTSCHALK
Attesting Officer               Acting Commissioner of Patents